(12) United States Patent
Ebesu et al.

(10) Patent No.: US 10,774,793 B2
(45) Date of Patent: Sep. 15, 2020

(54) INTAKE AND EXHAUST DEVICE FOR AUTOMOTIVE ENGINE

(71) Applicant: MAZDA MOTOR CORPORATION, Hiroshima (JP)

(72) Inventors: Hidesaku Ebesu, Hiroshima (JP); Kouichi Shimizu, Higashihiroshima (JP); Ryotaro Nishida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 10 days.

(21) Appl. No.: 16/103,753

(22) Filed: Aug. 14, 2018

(65) Prior Publication Data

US 2019/0063376 A1    Feb. 28, 2019

(30) Foreign Application Priority Data

Aug. 25, 2017   (JP) ................. 2017-162454

(51) Int. Cl.
*F02M 26/03*   (2016.01)
*F02B 33/34*   (2006.01)
(Continued)

(52) U.S. Cl.
CPC ............. *F02M 26/03* (2016.02); *F02B 29/04* (2013.01); *F02B 29/0468* (2013.01); *F02B 33/34* (2013.01); *F02M 26/09* (2016.02); *F02M 26/14* (2016.02); *F02M 26/17* (2016.02); *F02M 26/21* (2016.02); *F02M 26/22* (2016.02);
(Continued)

(58) Field of Classification Search
CPC .. F02M 26/03; F02M 26/28; F02M 35/10131; F02M 26/21; F02M 35/10052; F02M 26/70; F02M 26/30; F02M 35/112; F02M 26/41; F02M 35/10222; F02M 26/32; F02M 26/34; F02M 26/22; F02M 26/17; F02M 26/14; F02M 26/09; F02M 26/05; F02M 26/07; F02M 35/104; F02M 35/10255; F02M 35/10157; F02M 35/10006; F02M 26/35; F02B 33/44;
(Continued)

(56) References Cited

U.S. PATENT DOCUMENTS 9,719,470 B2 * 8/2017 Brewer ................ F02M 35/088
9,995,205 B2 * 6/2018 Park .................... F02B 29/0468
(Continued)

FOREIGN PATENT DOCUMENTS

CN        103485943 A    1/2014
CN        104454248 A    3/2015
(Continued)

*Primary Examiner* — Matthew T Largi
(74) *Attorney, Agent, or Firm* — Studebaker & Brackett PC

(57) ABSTRACT

Substances in external EGR gas are smoothly guided to a combustion chamber. An intake passage includes: a main intake passage including intake ports and communicating with a combustion chamber and having a supercharger interposed in the main intake passage; and a bypass passage branching off from the main intake passage upstream of the supercharger, and connected downstream of the supercharger; a flow rage adjustment valve changing a cross-sectional flow area of the bypass passage. The bypass passage is provided above the main intake passage, and includes an upper passage to which an EGR passage is connected.

6 Claims, 16 Drawing Sheets

(51) Int. Cl.

| | | |
|---|---|---|
| *F02M 26/32* | (2016.01) | |
| *F02B 29/04* | (2006.01) | |
| *F02M 35/10* | (2006.01) | |
| *F02M 26/41* | (2016.01) | |
| *F02M 35/112* | (2006.01) | |
| *F02M 26/30* | (2016.01) | |
| *F02M 26/70* | (2016.01) | |
| *F02M 26/21* | (2016.01) | |
| *F02M 26/28* | (2016.01) | |
| *F02M 26/09* | (2016.01) | |
| *F02M 26/14* | (2016.01) | |
| *F02M 26/17* | (2016.01) | |
| *F02M 26/22* | (2016.01) | |
| *F02M 26/34* | (2016.01) | |
| *F02B 37/16* | (2006.01) | |
| *F02M 26/07* | (2016.01) | |
| *F02M 26/05* | (2016.01) | |

(52) U.S. Cl.
CPC ............ *F02M 26/28* (2016.02); *F02M 26/30* (2016.02); *F02M 26/32* (2016.02); *F02M 26/34* (2016.02); *F02M 26/41* (2016.02); *F02M 26/70* (2016.02); *F02M 35/10052* (2013.01); *F02M 35/10131* (2013.01); *F02M 35/10222* (2013.01); *F02M 35/112* (2013.01); *F02B 37/16* (2013.01); *F02M 26/05* (2016.02); *F02M 26/07* (2016.02)

(58) Field of Classification Search
CPC ...... F02B 29/0468; F02B 29/04; F02B 33/34; F02B 37/16
See application file for complete search history.

(56) References Cited

U.S. PATENT DOCUMENTS

| | | | |
|---|---|---|---|
| 2011/0232598 A1* | 9/2011 | Harada | ............... F02M 29/00 123/184.47 |
| 2012/0192834 A1 | 8/2012 | Tonery | |
| 2015/0075162 A1 | 3/2015 | Yoshioka et al. | |
| 2016/0305374 A1 | 10/2016 | Jayakar et al. | |
| 2017/0234209 A1 | 8/2017 | Kondo et al. | |
| 2019/0309948 A1* | 10/2019 | Prociw | .................. F23K 5/14 |

FOREIGN PATENT DOCUMENTS

| | | |
|---|---|---|
| CN | 106089507 A | 11/2016 |
| EP | 2672087 A2 | 12/2013 |
| EP | 2924261 A1 | 9/2015 |
| JP | S61-019664 U | 2/1986 |
| JP | H07-091326 A | 4/1995 |
| JP | 07293356 A * | 11/1995 |
| JP | H07-293356 A | 11/1995 |
| JP | 2000-087810 A | 3/2000 |
| JP | 2003-322039 A | 11/2003 |
| JP | 3473100 B2 | 12/2003 |
| JP | 2013-108479 A | 6/2013 |
| JP | 2015-161227 A | 9/2015 |
| JP | 2016-217249 A | 12/2016 |

* cited by examiner

INTAKE AND EXHAUST DEVICE FOR AUTOMOTIVE ENGINE

CROSS-REFERENCE TO RELATED APPLICATION

This application claims priority to Japanese Patent Application No. 2017-162454 filed on Aug. 25, 2017, the entire disclosure of which is hereby incorporated by reference.

BACKGROUND

The present disclosure relates to an intake and exhaust device for an automotive engine.

As an example of an intake and exhaust device for an automotive engine, Japanese Unexamined Patent Publication No. 2016-217249 discloses an intake device for a supercharged engine. The intake and exhaust device includes: an engine body; an intake passage having a downstream end connected to the engine body via an intake manifold; an exhaust passage having an upstream end connected to the engine body via an exhaust manifold; and an exhaust gas recirculation (EGR) passage branching off from the exhaust passage and having a downstream end connected to the intake passage.

Furthermore, the intake passage cited in the Japanese Unexamined Patent Publication No. 2016-217249 includes a supercharger compressor interposed in the intake passage, and the supercharged engine further includes: a second intake passage (an air bypass passage) branching off from this intake passage upstream of the compressor, and connected downstream of the compressor; and a flow rate adjustment valve (an air bypass valve) changing a cross-sectional flow area of the second intake passage. The EGR passage has an upstream end connected upstream of a portion where the second intake passage branches off from the intake passage.

When such a supercharged engine runs, external EGR gas taken out of the exhaust passage is introduced into the intake passage upstream of the branching portion.

As cited in Japanese Unexamined Patent Publication No. 2016-217249, when the external EGR gas is introduced into the intake passage, such substances as water and soot contained in the external EGR gas are also sent back to the intake passage.

Usually, the substances contained in the external EGR gas are guided to a combustion chamber with a flow of the gas, and treated by evaporation and combustion in the combustion chamber. In order not to leave the substances in the intake passage, such substances are required to be smoothly introduced into the combustion chamber.

In view of the above requirement, the present disclosure is directed to an intake and exhaust device for an automotive engine. The device includes a second intake passage apart from an intake passage, allowing a substance in external EGR gas to smoothly lead to a combustion chamber.

SUMMARY

The technique disclosed herein is directed to an intake and exhaust device for an automotive engine. The device includes: an intake passage and an exhaust passage connected to a combustion chamber of the automotive engine; and an EGR (exhaust gas recirculation) passage branching off from the exhaust passage and having a downstream end connected to the intake passage.

The intake passage includes: a first intake passage including an intake port communicating with the combustion chamber and having a supercharger interposed in the first intake passage; and a second intake passage branching off, from the first intake passage, upstream of the supercharger, and bypassing the supercharger to communicate with the combustion chamber.

The second intake passage includes: a relay passage branching off from the first intake passage and extending above the engine; and an upper passage extending from an upper end of the relay passage and bypassing the supercharger, the upper passage being provided above the first intake passage.

The EGR passage is connected to the upper passage.

The statement "extending above the engine" shall not be limited to a configuration that the relay passage extends directly above the engine. The statement includes the case where the relay passage extends obliquely upward above the engine.

In a typical engine equipped with a supercharger, the substances carried by the gas flow adhere to, and are deposited inside, the supercharger. As a result, the performance of the supercharger could deteriorate.

On the other hand, such an engine disclosed in Japanese Unexamined Patent Publication No. 2016-217249 would allow a gas flow through the second intake passage to create, so that the gas is guided to bypass the supercharger and reach the combustion chamber. Studies are being conducted to take advantage of such a gas flow to guide the substances to the combustion chamber while the substances do not pass through the supercharger.

In this case, substances can be guided to the combustion chamber while the supercharger is kept from deteriorating in performance; however, the inventors involved in the present application have diligently continued their studies and found out that this embodiment would have room to improve in smoothly guiding the substances, depending on how the intake passage and the second intake passage are located in relation to each other.

Specifically, for a layout, for example, the second intake passage might be provided above the intake passage. In such a case, if the downstream end of the EGR passage is connected to the intake passage as described in Japanese Unexamined Patent Publication No. 2016-217249, the substances introduced into the intake passage need to be brought upward through the branching portion to be guided to the second intake passage. This case would be disadvantageous in smoothly introducing the substances for potential energy required to bring the substances up.

On the other hand, the above configuration makes it possible to create a gas flow through the second intake passage, not a gas flow through the first intake passage provided with the supercharger, so that the gas can be guided to bypass the supercharger and reach the combustion chamber. Taking advantage of such a gas flow, the substances, flown back to the intake passage, can be guided to the combustion chamber, without adhering to and getting deposited on the supercharger.

While the upper passage of the second intake passage is provided above the first intake passage, the EGR passage is connected to the upper passage. Specifically, the substances to be flown back to the intake passage are directly introduced into the second intake passage without passing through the first intake passage.

Compared with a configuration in which the EGR passage is connected to the first intake passage, the above configuration is advantageous in guiding the substances smoothly since the configuration eliminates the need of the potential energy for bringing up the substances from the first intake passage to the second intake passage. The substances introduced into the second intake passage is guided to the combustion chamber, using the gas flow as described above, and combusted in the combustion chamber together with the air-fuel mixture.

Hence, without adhering to, and being deposited on, the supercharger, the substances in the external EGR gas can be smoothly guided to the combustion chamber.

The upper passage may include a flow rate adjustment valve changing a cross-sectional flow area of the second intake passage, and the EGR passage may be connected to the upper passage upstream of the flow rate adjustment valve.

In this configuration, the external EGR gas flowing back through the EGR passage is introduced upstream of the flow rate adjustment valve. Hence, even in an operating state in which the flow rate adjustment valve is fully closed in a supercharging range, the external EGR gas can be guided from the second intake passage to the first intake passage.

Such a feature makes it possible to achieve both of smooth introduction of the substances in the external EGR gas into the combustion chamber, and backflow of the external EGR gas in the supercharging range.

An EGR cooler may be interposed in the EGR passage, the EGR cooler cooling gas passing through the EGR passage, wherein in the EGR passage, the EGR cooler may have a downstream portion and an upstream portion, the downstream portion being higher than the upstream portion (e.g. extending upward as coming closer to the upper passage).

The gas passing through the EGR passage (i.e., the external EGR gas) is cooled when passing through the EGR cooler. Here, the water contained in the external EGR gas could be condensed water.

Then, in accordance with the above configuration, a portion of the EGR passage downstream of the EGR cooler; namely a portion between the EGR cooler and the downstream end of the EGR passage, extends upward as running toward the upper passage. Hence, the condensed water generated in the EGR cooler flows down opposite the upper passage by gravity, so that less condensed water flows into the second intake passage. As a result, the amount of water contained in the substances flown back to the second intake passage can be reduced, which is advantageous in reducing the risk of the water adhering to the supercharger.

The connection of the upper passage to the EGR passage may be provided with a water receiving structure to keep condensed water from flowing into the first intake passage, the condensed water being generated in the EGR passage and the upper passage.

When the EGR gas containing water flows back to the intake passage, condensed water could be generated from the water in the upper passage and the EGR passage.

This configuration allows the upper passage to receive the condensed water. Hence, even in an operating range as the supercharging range in which the gas is guided through the first intake passage, the above configuration makes it possible to reduce the risk of the condensed water flowing from the second intake passage to the first intake passage. This feature is advantageous in reducing the risk of the water adhering to the supercharger.

The first intake passage may further include: a downstream passage including the intake port and connected through the intake port to the combustion chamber; and a surge tank connected to an upstream end of the downstream passage is connected, and the upper passage may be connected to the surge tank.

In this configuration, the upper passage is connected to the surge tank. Compared with a configuration in which the upper passage is connected to a passage upstream of the surge tank, for example, the above feature makes it possible to provide the downstream end of the upper passage close to the intake port. As a result, thanks to the gas flow through the second intake passage, the substances in the external EGR gas can be smoothly guided to the intake port, and then to the combustion chamber.

An intercooler may be interposed in the first intake passage upstream of the surge tank, and a backflow reduction structure is provided. In the first intake passage, the intercooler may be located below the surge tank when the engine is mounted in a vehicle, and the first intake passage may include an introduction passage connecting the intercooler and a bottom of the surge tank, and the backflow reduction structure may be provided in an interval between (i) an upstream end of the introduction passage and (ii) a connection between a downstream end of the introduction passage and the surge tank, to reduce an amount of condensed water flowing toward the intercooler.

When the gas containing water is cooled in the intercooler, condensed water could be generated from the water in a passage downstream of the intercooler.

For example, a normal engine has a surge tank provided downstream of an intercooler, such that the condensed water is usually generated in the surge tank and deposited on the bottom of the surge tank.

However, when the intercooler is provided below the surge tank while the engine is mounted in the vehicle, the condensed water flowing down by gravity might stay on the bottom of the intercooler. Thus, for example, when the load on the engine increases such that a flow rate of the gas taken from outside rises, the condensed water could enter in large amount from the intercooler through the surge tank and the intake port into the combustion chamber, and cause water hammer. The water hammer is disadvantageous in providing the engine with sufficient durability.

As a counter measure, the surge tank and the intercooler could be horizontally arranged side by side to keep the condensed water from backflow into the intercooler; however, this layout is not advantageous because such a layout makes the engine size excessively large as a whole and the arrangement of the entire intake passages difficult.

Whereas, in the above configuration, the intake passage is provided with the backflow reduction structure in an interval including a passage downstream of the intercooler. Such a feature allows the condensed water, generated in the surge tank and flowing into the surge tank from outside, not to flow toward the intercooler. As a result, less condensed water backflows, eventually reducing various disadvantages such as water hammer.

Moreover, the surge tank and the intercooler may be vertically arranged. Even if flowing down by gravity, the condensed water can be received by the backflow reduction structure before reaching the intercooler. Such a feature is advantageous in downsizing the engine.

Hence, the above configuration allows the engine to be downsized and reduce the risk of water hammer caused by the condensed water.

Another technique disclosed herein is directed to an intake and exhaust device for an automotive engine. The device includes: an intake passage and an exhaust passage connected to a combustion chamber of the automotive engine; and an EGR (exhaust gas recirculation) passage branching off from the exhaust passage and having a downstream end connected to the intake passage.

The intake passage includes: a first intake passage including an intake port communicating with the combustion chamber and having a supercharger interposed in the first intake passage; and a second intake passage branching off, from the first intake passage, upstream of the supercharger, and bypassing the supercharger to communicate with the combustion chamber.

The second intake passage includes: a relay passage branching off from the first intake passage; and an upper passage provided to extend from the relay passage and bypassing the supercharger.

The upper passage is provided above an upstream end of the intake port.

The EGR passage is connected to the upper passage.

For example, a gas flow is created through the second intake passage, not a gas flow through the first intake passage provided with the supercharger, so that the gas is guided to bypass the supercharger and reach the combustion chamber. Taking advantage of such a gas flow, the substances, flown back to the intake passage, can be guided to the combustion chamber, without adhering to and getting deposited on the supercharger.

The above configuration makes it possible to guide the substances, contained in the external EGR gas introduced from the EGR passage into the upper passage of the second intake passage, to the upstream end of the intake port, eliminating the need of guiding the substances upward against the gravity. As a result, the substances can be smoothly guided to the combustion chamber.

Hence, without adhering to, and being deposited on, the supercharger, the substances in the external EGR gas can be smoothly guided to the combustion chamber.

Still another technique disclosed herein is directed to an intake and exhaust device for an automotive engine. The device includes: an intake passage and an exhaust passage connected to a combustion chamber of the automotive engine; and an EGR (exhaust gas recirculation) passage branching off from the exhaust passage and having a downstream end connected to the intake passage.

The intake passage includes an upper passage provided above an upstream end of an intake port communicating with the combustion chamber.

The EGR passage is connected to the upper passage.

The above configuration makes it possible to guide the substances, contained in the external EGR gas introduced from the EGR passage into the upper passage of the intake passage, to the upstream end of the intake port, eliminating the need of guiding the substances upward against the gravity. As a result, the substances can be smoothly guided to the combustion chamber. Such a configuration is especially advantageous in the case where the substances are guided to the combustion chamber, keeping the substances from adhering and getting deposited on the supercharger, particularly when the bypass passage for bypassing the supercharger is used as an intake passage.

Hence, particularly in an engine equipped with a supercharger, substances in the external EGR gas can be smoothly guided to the combustion chamber.

As described above, the intake and exhaust device for an automotive engine can smoothly guide substances contained in the external EGR gas to the combustion chamber.

DETAILED DESCRIPTION

Figure 1:
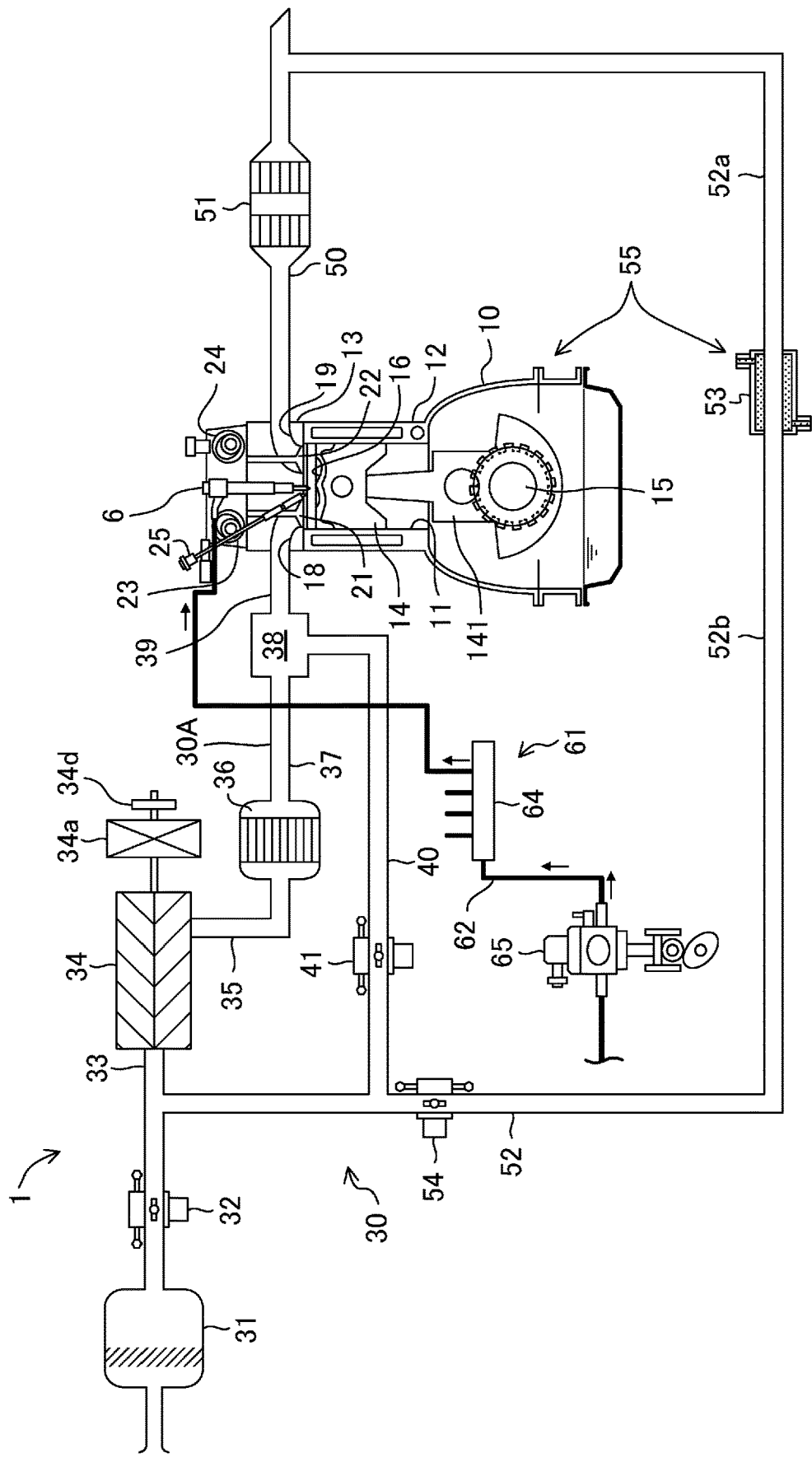
FIG. 1 is a schematic view illustrating an example of an engine.
Figure 2:
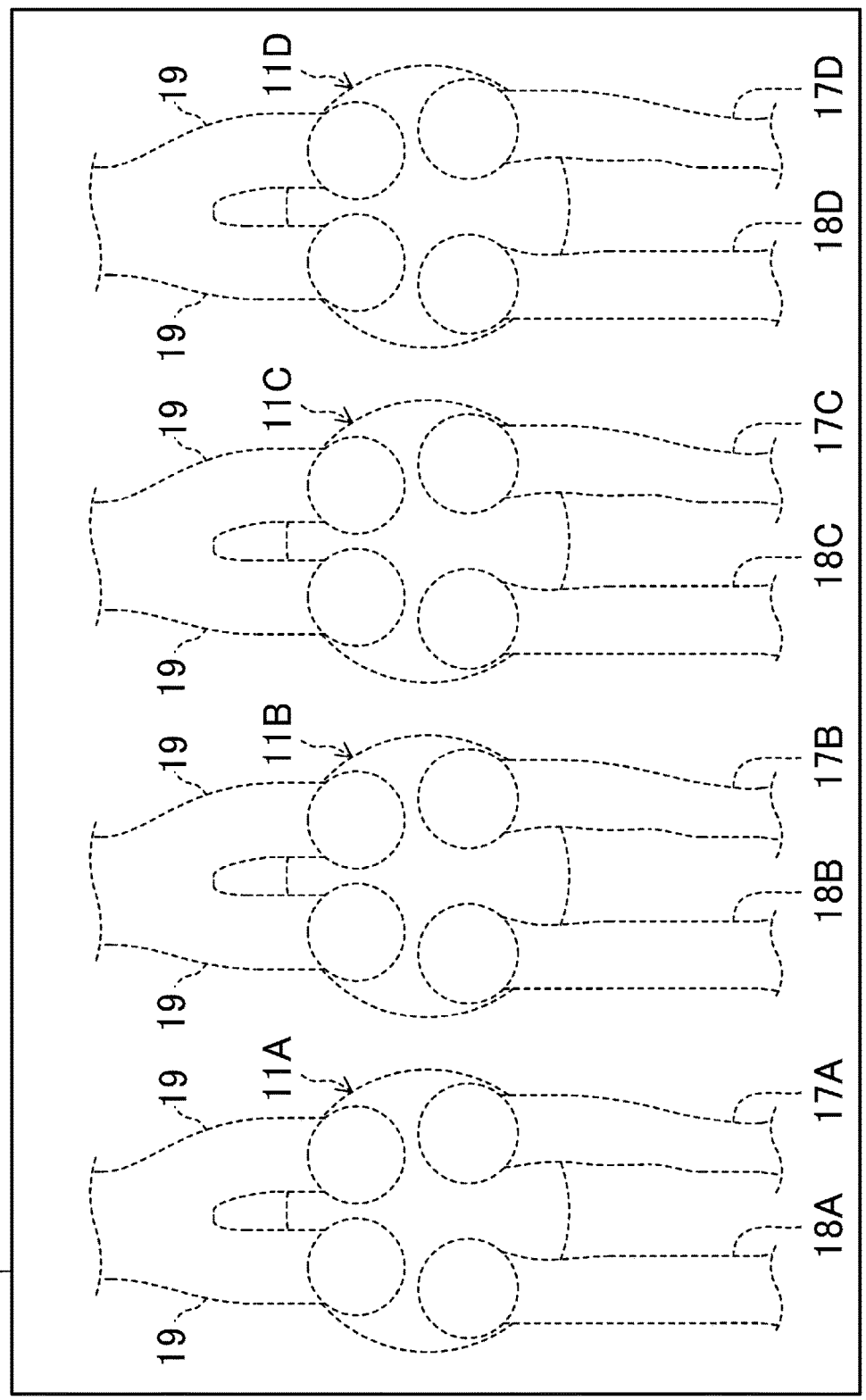
FIG. 2 is a plan view schematically illustrating a configuration around four cylinders.

Embodiments of an intake and exhaust device for an automotive engine will now be described in detail with reference to the drawings. The following description is only an example. FIG. 1 is a schematic view illustrating an exemplary configuration of an engine 1 provided with the intake and exhaust device of an automotive engine disclosed herewith. FIG. 2 is a plan view schematically illustrating a configuration around four cylinders 11.

The engine 1 is a gasoline engine (particularly, a four-stroke internal combustion engine) mounted in a front-engine-front-wheel-drive (FF) vehicle. As illustrated in FIG. 1, the engine 1 includes a mechanically driven supercharger 34.

The engine 1 according to this embodiment is a so-called in-line four-cylinder transverse engine including four cylinders 11 arranged in line along the vehicle width as shown in FIG. 2. In this embodiment, the engine front-aft direction, along which the four cylinders 11 are arranged (along a cylinder bank), is substantially the same as the vehicle width direction, while the engine width direction is substantially the same as the vehicle front-aft direction.

Hereinafter, unless otherwise noted, the term "front" means either side in the engine width direction (the front in the vehicle front-aft direction), the term "rear" means the other side in the engine width direction (the rear in the vehicle front-aft direction), the term "left" means either side in the engine front-aft direction; namely, the cylinder bank (the left in the vehicle width direction to the rear of the engine), and the term "right" means the other side in the engine front-aft direction; namely, the cylinder bank (the right in the vehicle width direction to the front of the engine).

In the following description, the term "upper side" means the upper side in the vehicle height direction, with the engine 1 mounted in the vehicle (hereinafter also referred to as an "in-vehicle mounted state), and the term "lower side" means the lower side in the vehicle height direction in the in-vehicle mounted state.

Outline Configuration of Engine

In this exemplary configuration, the engine 1 is of a front-intake and rear-exhaust type. Specifically, as illustrated in FIG. 2, the engine 1 includes: an engine body 10 having the four cylinders 11; an intake passage 30 provided to the front of the engine body 10 and communicating with a corresponding one of the cylinders 11 via intake ports 17 and 18; and an exhaust passage 50 provided to the rear of the engine body 10 and communicating with a corresponding one of the cylinders 11 via exhaust ports 19. Note that FIG. 1 illustrates only one of the cylinders 11.

In this exemplary configuration, the intake passage 30 is an intake device including: multiple passages introducing gas; devices such as a supercharger 34 and an intercooler 36; and an air bypass passage (hereinafter simply referred to as "bypass passage") 40 bypassing these devices, all of which are combined as a unit. Together with the exhaust passage 50 and an EGR passage 52, this intake device constitutes an intake and exhaust device according to this embodiment.

In the cylinders 11, the engine body 10 combusts a mixture of fuel and gas supplied from the intake passage 30 in a predetermined combustion order. Specifically, the engine body 10 includes a cylinder block 12, and a cylinder head 13 placed above the cylinder block 12.

Inside the cylinder block 12, the four cylinders 11 are formed. The four cylinders 11 are arranged in line along the central axis of a crankshaft 15 (along the cylinder bank). Each of the four cylinders 11 is formed like a tube. The central axes of the cylinders 11 (hereinafter referred to as cylinder axes) extend parallel to each other, and perpendicularly to the length of the cylinder bank. The four cylinders 11 shown in FIG. 2 may be hereinafter referred to as a first cylinder 11A, a second cylinder 11B, a third cylinder 11C, and a fourth cylinder 11D in this order from the right along the cylinder bank.

A piston 14 is slidably fitted into each of the cylinders 11. The piston 14 is coupled to the crankshaft 15 through a connecting rod 141. The piston 14 defines a combustion chamber 16 together with the cylinder 11 and the cylinder head 13. The combustion chamber 16 has a ceiling face shaped into a so-called pent roof. Note that the "combustion chamber" here is not limited to a space defined when the piston 14 reaches a compression top dead center. The term "combustion chamber" is used in a broad sense.

The cylinder head 13 has two intake ports 17 and 18 provided for each cylinder 11. The two intake ports 17 and 18 communicate with the combustion chamber 16. Each cylinder 11 has a first port 17 and a second port 18 provided adjacent to the first port 17 along the cylinder bank. The first port 17 and the second port 18 are arranged in the same order in any of the first cylinder 11A to the fourth cylinder 11D. Specifically, as shown in FIG. 2, in each of the cylinders 11, the second port 18 and the first port 17 are arranged in this order from the right along the cylinder bank.

Each of the intake ports 17 and 18 has an upstream end opening on an outer surface 10a (an outer surface to the front and hereinafter also referred to as "mounting surface") to one end of the engine body 10, and connected to a downstream end of a duct included in the intake passage 30. On the other hand, the downstream ends of the ports 17 and 18 are open to the ceiling face of the combustion chamber 16.

Hereinafter, a reference character "17A" instead of "17" may be assigned to the first port communicating with the first cylinder 11A, while a reference character "18A" instead of "18" may be assigned to the second port communicating with the cylinder 11A. This is also applicable to the second to fourth cylinders 11B to 11D. For example, a reference character "18C" instead of "18" may be assigned to the second port communicating with the third cylinder 11C.

Note that the two intake ports 17 and 18 are shaped into a so-called tumble port, so that the gas flowing into the combustion chamber 16 creates a tumble in the combustion chamber 16.

The two intake ports 17 and 18 include, for each cylinder 11, a swirl control valve (SCV) port limiting a flow rate of the passing gas through a swirl control valve 81. In this embodiment, the second port 18 described above serves as the SCV port. (See FIG. 4.)

Specifically, the intake ports 17 and 18 according to this exemplary configuration are shaped to promote creation of a tumble flow. Meanwhile, the intake ports 17 and 18 control creation of a swirl flow through the SCV 81.

Each of the two intake ports 17 and 18 is provided with an intake valve 21. Each intake valve 21 opens and closes between the combustion chamber 16 and one of the intake port 17 or the intake port 18. The intake valve 21 is opened and closed by an intake valve train mechanism at predetermined timing.

In this exemplary configuration, the intake valve train mechanism includes as illustrated in FIG. 1 an electric intake sequential-valve timing (S-VT) 23 acting as a variable valve train mechanism. The electric intake S-VT 23 continuously changes a rotational phase of an intake camshaft within a predetermined angle range. Accordingly, an opening time point and a closing time point of the intake valve 21 change continuously. Note that the intake valve train mechanism may include a hydraulic S-VT instead of the electric intake S-VT 23.

The cylinder head 13 also has two exhaust ports 19 provided for each cylinder 11. The two exhaust ports 19 communicate with the combustion chamber 16.

Each of the two exhaust ports 19 is provided with an exhaust valve 22. Each exhaust valve 22 opens and closes between the combustion chamber 16 and one of the exhaust ports 19. The exhaust valve 22 is opened and closed by an exhaust valve train mechanism at predetermined timing.

In this exemplary configuration, the exhaust valve train mechanism includes as illustrated in FIG. 1 an electric exhaust sequential-valve timing (S-VT) 24 acting as a variable valve train mechanism. The electric exhaust S-VT 24 continuously changes a rotational phase of an exhaust camshaft within a predetermined angle range. Accordingly, an opening time point and a closing time point of the exhaust valve 22 change continuously. Note that the exhaust valve train may include a hydraulic S-VT instead of the electric S-VT.

Although not described in detail, in this engine 1, the electric intake S-VT 23 and the electric exhaust S-VT 24 adjust a length of an overlap period between the opening time point of the intake valve 21 and the closing time point of the exhaust valve 22. This adjustment makes it possible to scavenge residual gas within the combustion chamber 16, and hold hot combusted gas in the combustion chamber 16 (i.e., introduces internal exhaust gas recirculation (EGR) gas into the combustion chamber 16). In this exemplary configuration, the electric intake S-VT 23 and the electric exhaust S-VT 24 constitute an internal EGR system. Note that the internal EGR system is not necessarily constituted of S-VTs.

The cylinder head 13 has an injector 6 provided for each cylinder 11. In this exemplary configuration, the injector 6 is a multi-nozzle fuel injection valve which directly injects fuel into the combustion chamber 16.

The injector 6 is connected to a fuel supply system 61. The fuel supply system 61 includes a fuel tank (not shown) which stores fuel, and a fuel supply passage 62 connecting the fuel tank and the injector 6 together. The fuel supply passage 62 is interposed between a fuel pump 65 and a common rail 64. The fuel pump 65 pumps out fuel to the common rail 64. In this exemplary configuration, the fuel pump 65 is a plunger pump driven by the crankshaft 15. The common rail 64 stores the fuel pumped out of the fuel pump 65 at a high fuel pressure.

When the injector 6 opens, the fuel stored in the common rail 64 is injected through the nozzle of the injector 6 into the combustion chamber 16.

The cylinder head 13 has a spark plug 25 provided for each cylinder 11. The spark plug 25 has a tip protruding into the combustion chamber 16, so that the spark plug 25 forcibly ignites the air-fuel mixture inside the combustion chamber 16.

The intake passage 30 is connected to the mounting surface 10a that is the outer surface to the front of the engine body 10. The intake passage 30 includes the intake ports 17 and 18 for each cylinder 11. Specifically, the intake passage 30 conducts gas to be introduced into the combustion chamber 16, and is connected through the intake ports 17 and 18 to the combustion chamber 16.

An air cleaner 31 filtering fresh air is provided to an upstream end of the intake passage 30. Whereas, a surge tank 38 is provided near a downstream end of the intake passage 30. An independent passage 39 is provided to the intake passage 30 downstream of the surge tank 38. The independent passage 39 branches into two for each cylinder 11.

One of the two independent passages 39 branched is connected to the first port 17, while the other is connected to the second port 18. Details of the independent passages 39 will be described later. Hereinafter, a reference character "391" may be assigned to the former independent passage 39, while a reference character "392" may be assigned to the latter. The downstream end of each independent passage 39 is connected to a corresponding one of the intake ports 17 and 18 of the cylinder 11.

A throttle valve 32 is provided to the intake passage 30 between the air cleaner 31 and the surge tank 38. An opening of the throttle valve 32 is adjusted to regulate the amount of fresh air to be introduced into the combustion chamber 16.

In the intake passage 30, the supercharger 34 is provided downstream of the throttle valve 32. The supercharger 34 supercharges the gas to be introduced into the combustion chamber 16. In this exemplary configuration, the supercharger 34 is mechanically driven by the engine 1 (specifically, power transmitted from the crankshaft 15). This supercharger 34 may be, but not limited to, a Roots supercharger. Examples of the supercharger 34 include a Lysholm supercharger and a centrifugal supercharger.

An electromagnetic clutch 34a is interposed between the supercharger 34 and the crankshaft 15. The electromagnetic clutch 34a transmits and blocks driving force between the supercharger 34 and the crankshaft 15. A control unit (not shown) such as an engine control unit (ECU) selectively engages and disengages the electromagnetic clutch 34a to turn on and off the supercharger 34. Specifically, the operation of this engine 1 is switched between a mode of supercharging the gas to be introduced into the combustion chamber 16 and a mode of not supercharging the gas to be introduced into the combustion chamber 16 by turning on and off the supercharger 34.

In the intake passage 30, the intercooler 36 is provided downstream of the supercharger 34. The intercooler 36 cools the gas compressed by the supercharger 34. The intercooler 36 of this exemplary configuration is of a water-cooling type.

As a passage connecting various kinds of devices incorporated in the intake passage 30, the intake passage 30 includes: a first passage 33 provided downstream of the air cleaner 31 and guiding the gas filtered through the air cleaner 31; a second passage 35 guiding the gas compressed by the supercharger 34 to the intercooler 36; and a third passage 37 guiding the gas cooled by the intercooler 36 to the surge tank 38. In order to reduce the length of the passage (runner) from the surge tank 38 to the intake ports 17 and 18, the surge tank 38 is provided near inlets (upstream ends) of the intake ports 17 and 18.

In the intake passage 30, the first passage 33, the second passage 35, the third passage 37, and the surge tank 38 constitute a "main intake passage" in which the supercharger 34 and the intercooler 36 are interposed in the stated order from upstream along the flow of the gas. Hereinafter, a reference character "30A" may be assigned to the main intake passage. Note that the main intake passage 30A is an example of "a first intake passage." The third passage 37 is an example of "an introduction passage."

The intake passage 30 is provided with a bypass passage 40 apart from the main intake passage 30A. The bypass passage bypasses the supercharger 34 and the intercooler 36. Specifically, the bypass passage 40 branches off from the main intake passage 30A upstream of the supercharger 34, and bypasses the supercharger 34 to connect to the combustion chamber 16. More specifically, in the main intake passage 30A, the bypass passage 40 extends from downstream of the throttle valve 32 toward upstream of the supercharger 34, and bypasses the supercharger 34 and the intercooler 36 to connect to the surge tank 38. Note that the bypass passage 40 is an example of "a second introduction passage."

The bypass passage 40 is also provided with an air bypass valve (hereinafter simply referred to as "a bypass valve") 41 changing a cross-sectional flow area of the bypass passage 40. The bypass valve 41 changes the cross-sectional flow area of the bypass passage 40 to adjust the flow rate of the gas flowing through the bypass passage 40. Note that the bypass valve 41 is an example of "a flow rate adjustment valve."

When the supercharger 34 is turned off (i.e., when the electromagnetic clutch 34a is disengaged), the bypass valve 41 fully opens. This allows the gas flowing through the intake passage 30 to bypass the supercharger 34 and flow into the surge tank 38, and to be introduced through the independent passages 39 into the combustion chamber 16. The engine 1 is operated without supercharging, that is, by natural aspiration.

When the supercharger 34 is turned on (i.e., when the electromagnetic clutch 34a is engaged), the opening of the bypass valve 41 is adjusted as appropriate. This allows part of gas, which has passed through the supercharger 34 in the intake passage 30, to flow back upstream of the supercharger 34 through the bypass passage 40. A rate of the backflow gas can be adjusted through adjustment of the opening of the bypass valve 41. Through the backflow rate, a supercharging pressure of the gas to be introduced into the combustion chamber 16 can be adjusted. In this exemplary configuration, the supercharger 34, the bypass passage 40, and the bypass valve 41 constitute a supercharging system.

Meanwhile, the exhaust passage 50 is connected to the outer surface to the rear of the engine body 10, and communicates with the exhaust ports 19 of each cylinder 11. The exhaust passage 50 conducts exhaust gas discharged from the combustion chamber 16. Although not shown in detail, an upstream part of the exhaust passage 50 forms independent passages, each of which branches off for one of the cylinders 11. An upstream end of each independent passage is connected to a corresponding one of the exhaust ports 19 of the cylinders 11.

The exhaust passage 50 is provided with an exhaust gas purification system including one or more catalyst converters 51. Each of the catalyst converters 51 includes a three-way catalyst. Note that the exhaust gas purification system may include any given catalyst other than the three-way catalyst. Moreover, the catalyst converter 51 is an example of "an exhaust purifier."

The EGR passage 52 acting as an external EGR system is connected between the intake passage 30 and the exhaust passage 50. The EGR passage 52 allows part of the combusted gas to flow back to the intake passage 30. Specifically, an upstream end of the EGR passage 52 is connected to the exhaust passage 50 downstream of the catalyst converter 51. Meanwhile, a downstream end of the EGR passage 52 is connected to the intake passage 30 upstream of the supercharger 34 and downstream of the throttle valve 32.

Figure 3:
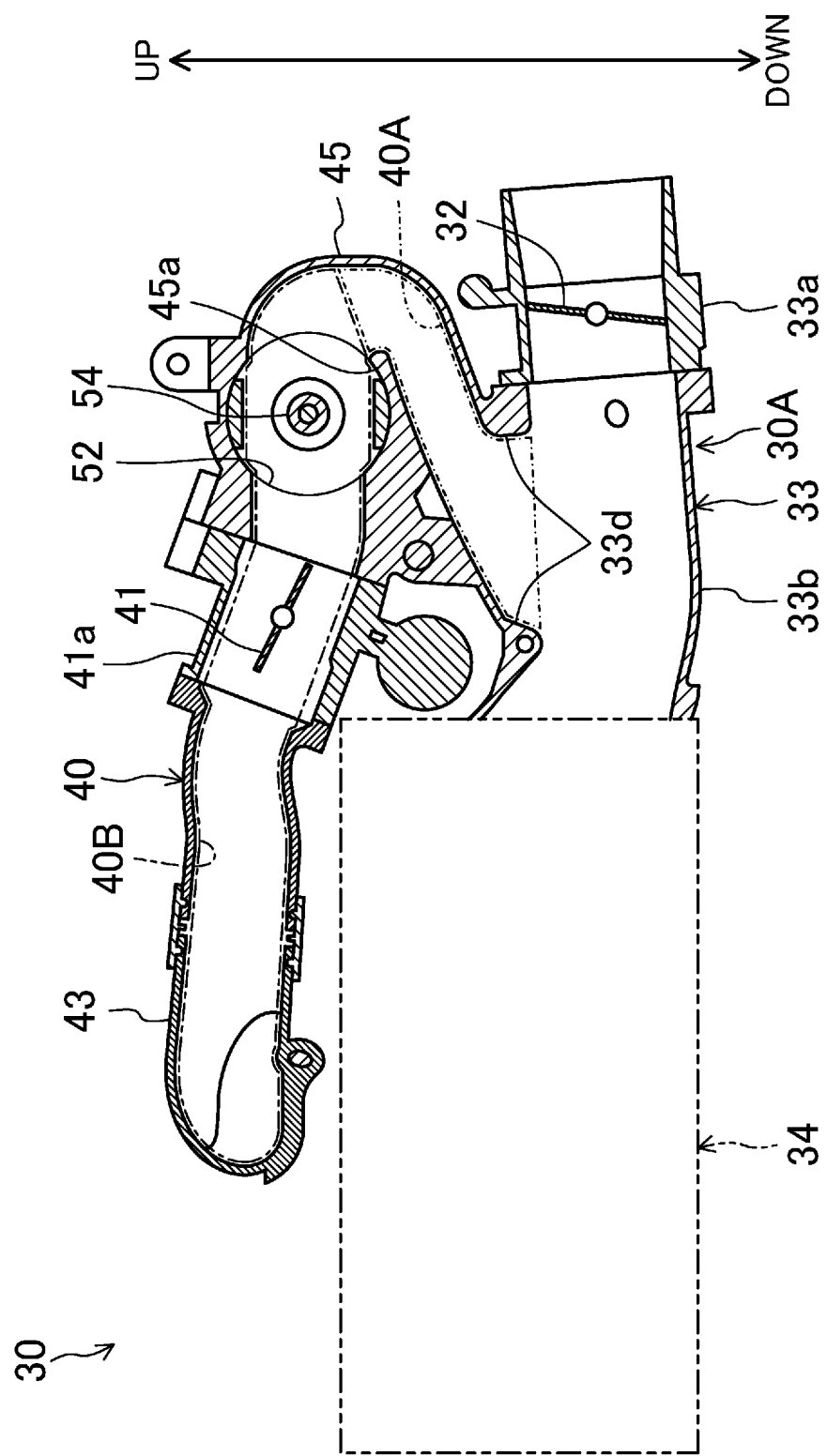
FIG. 3 is a vertical cross-sectional view of an intake passage.

The EGR passage 52 is provided with a water-cooled EGR cooler 53. The EGR cooler 53 cools the combusted gas. An EGR valve 54A adjusts a flow rate of the combusted gas flowing through the EGR passage 52. On the drawing plane of FIG. 1, the EGR valve 54 is illustrated to be provided to the EGR passage. Actually, however, the EGR valve 54 is provided to the bypass passage 40 as illustrated in FIG. 3 Through adjustment of the opening of the EGR valve 54, the backflow rate of the cooled combusted gas; that is, the external EGR gas, can be adjusted.

In this exemplary configuration, an EGR system 55 includes the external EGR system including the EGR passage 52 and the EGR valve 54, and the internal EGR system including the electric intake S-VT 23 and the electric exhaust S-VT 24 described above.

(Configuration of Intake Passage)

A configuration of the intake passage 30 will now be described in detail.

Figure 4:
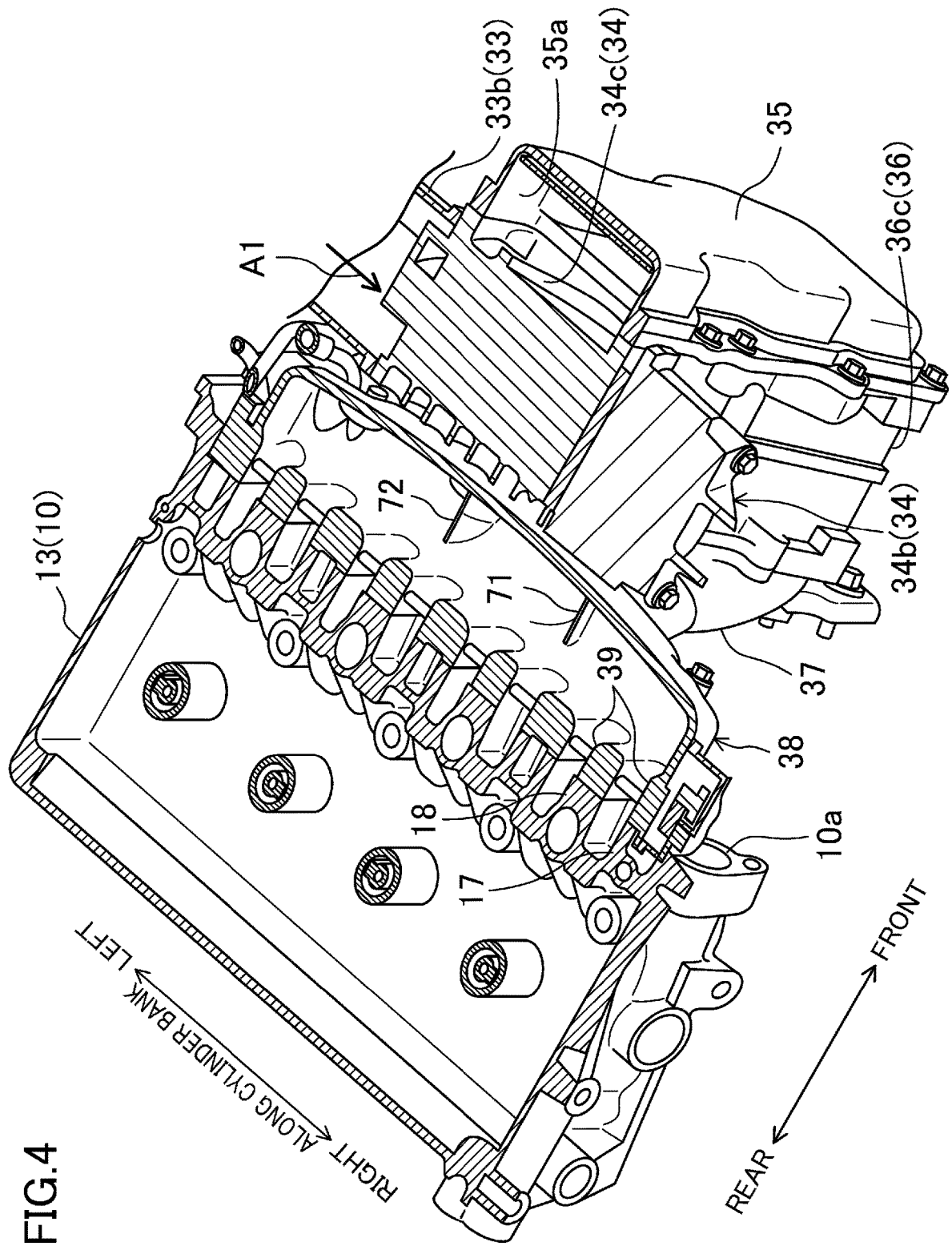
FIG. 4 is a horizontal cross-sectional view illustrating a passage structure close to a supercharger.
Figure 5:
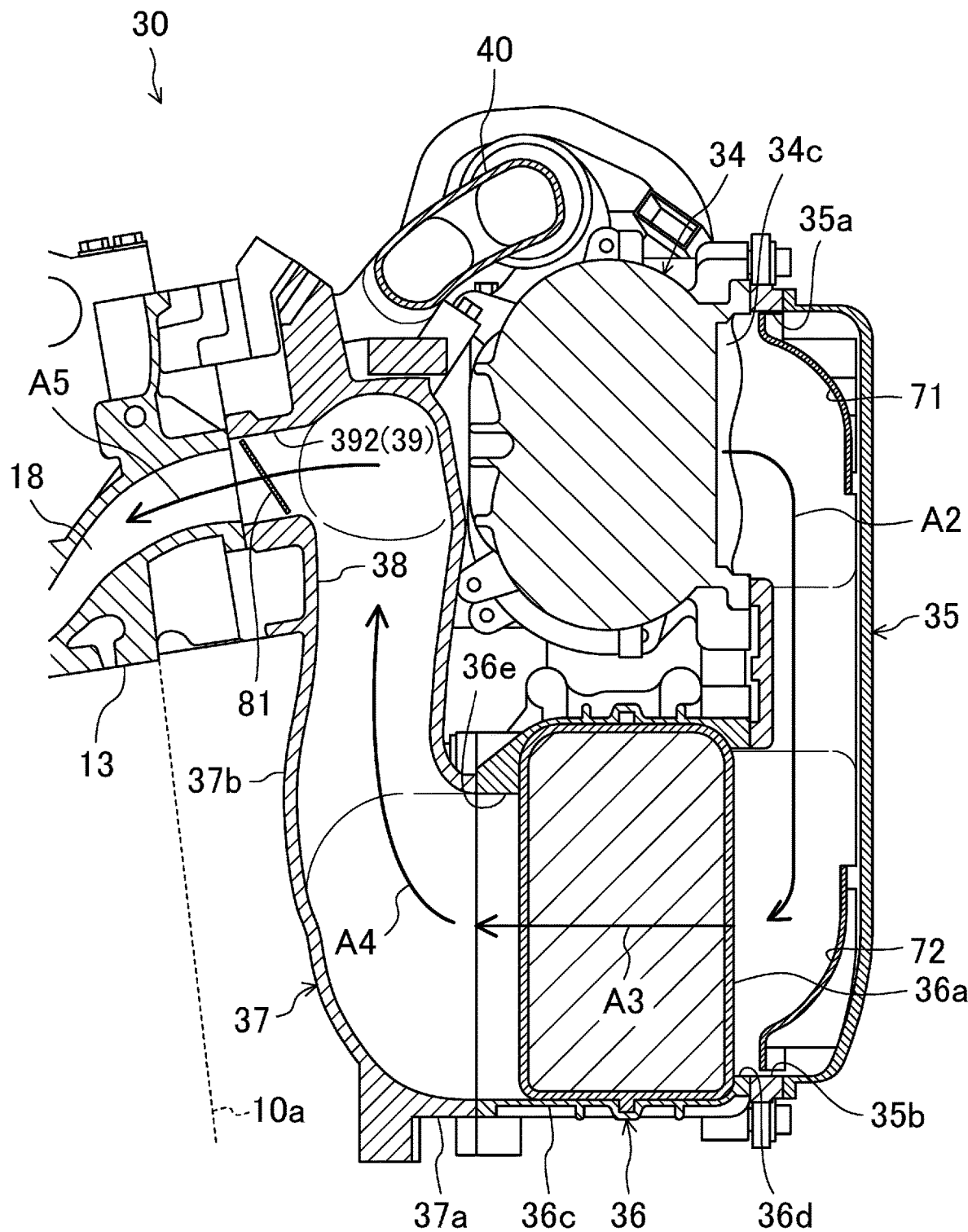
FIG. 5 is a vertical cross-sectional view illustrating the passage structure close to a supercharger.
Figure 6:
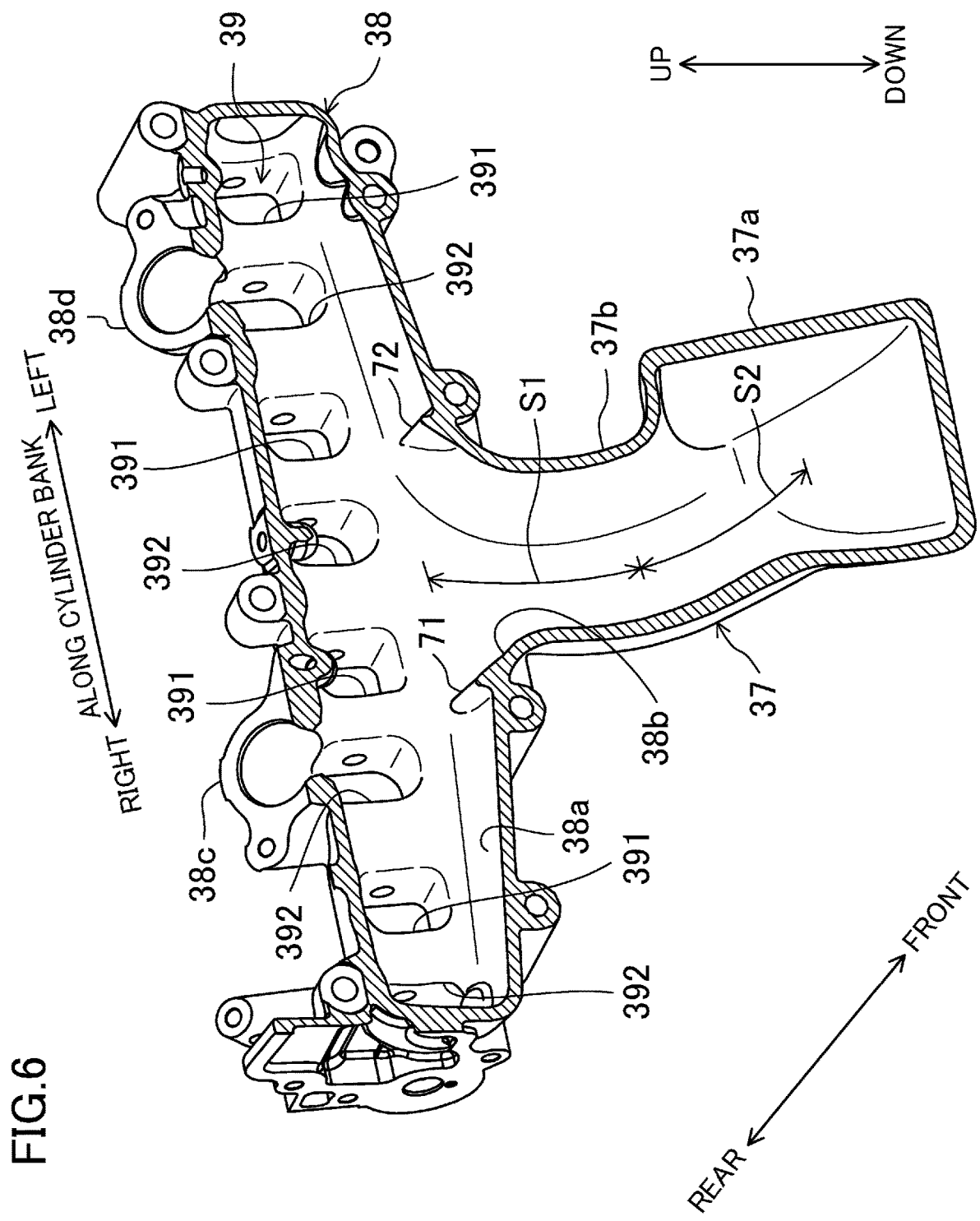
FIG. 6 is a perspective view illustrating a vertical cross-section around a surge tank.
Figure 7:
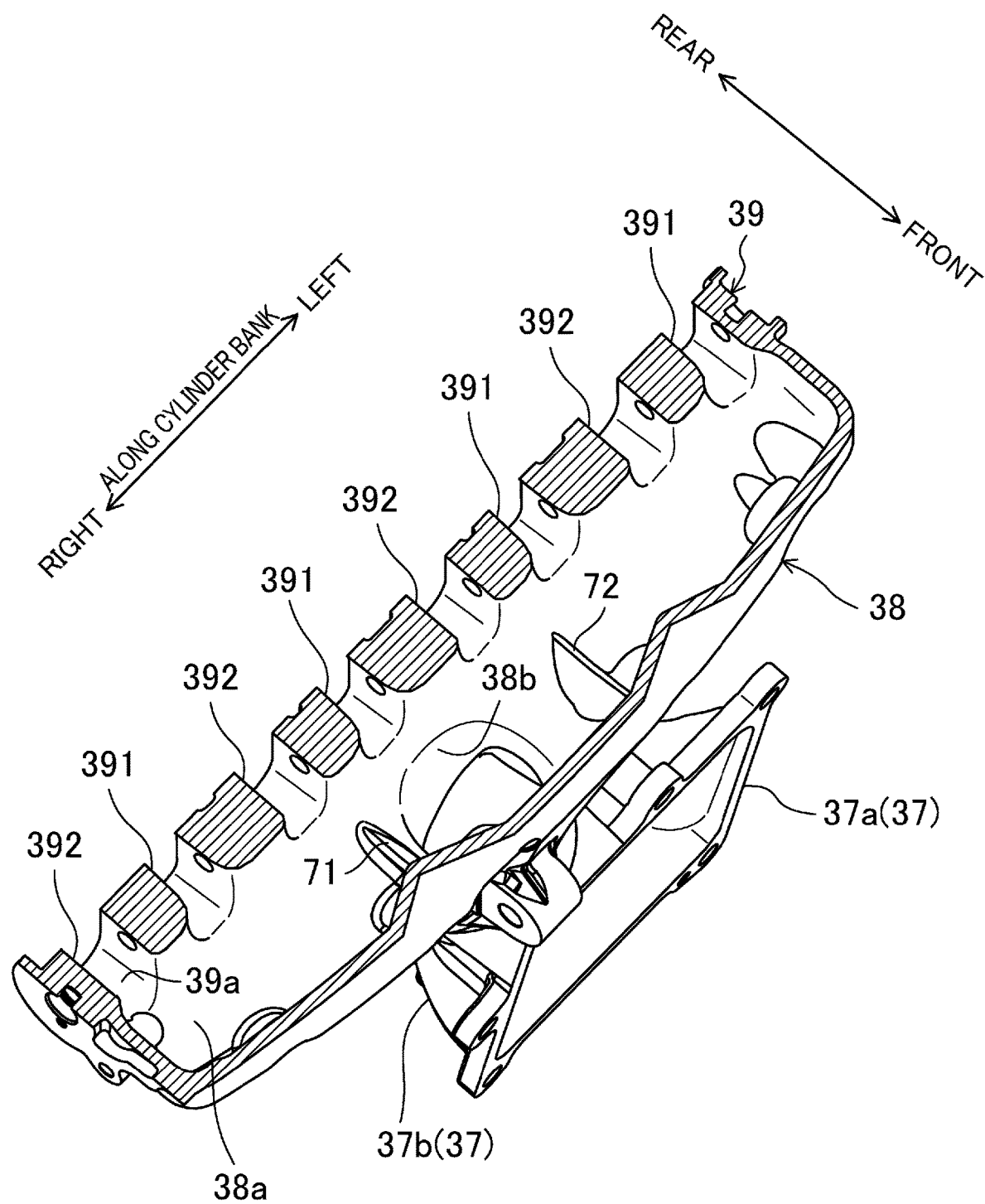
FIG. 7 is a perspective view illustrating a vertical cross-section different from the vertical cross-section in FIG. 6.

FIG. 3 is a vertical cross-sectional view of the intake passage 30. FIG. 4 is a horizontal cross-sectional view illustrating a structure, of the intake passage 30, close to the supercharger 34. FIG. 5 is a vertical cross-sectional view of the structure of the intake passage 30. Moreover, FIG. 6 is a perspective view illustrating a vertical section around the surge tank 38. FIG. 7 is a perspective view illustrating a vertical cross-section different from the vertical section in FIG. 6.

The constituent elements of the intake passage 30 are provided to the front of the engine body 10, specifically, to the front of the mounting surface 10a described above. Note that the mounting surface 10a is outer surfaces to the front of the cylinder head 13 and the cylinder head 12.

Furthermore, as described above, the intake passage 30 includes: multiple passages (specifically, the first passage 33, the second passage 35, the third passage 37, the surge tank 38, and the independent passage 39) to introduce gas; devices such as the supercharger 34 and the intercooler 36; and the bypass passage 40 bypassing these devices, all of which are combined. As illustrated in drawings such as FIG. 3, the main intake passage 30A included in the intake passage 30 is provided below the bypass passage 40.

Described first is a schematic layout of these constituent elements.

As illustrated in FIGS. 3 to 5, the supercharger 34 is provided across the surge tank 38 from the engine body 10. In accordance with the size of the surge tank 38, a clearance is provided between the rear surface of the supercharger 34 and the mounting surface 10a. The first passage 33 extends along the cylinder bank on the left of the supercharger 34, and is connected to the left end of the supercharger 34. Moreover, the supercharger 34 is provided above the intercooler 36. The supercharger 34 and the intercooler 36 are arranged side by side in the vertical direction. The second passage 35 extends vertically to connect the front of the supercharger 34 to the front of the intercooler 36. The surge tank 38 is located in the clearance between the supercharger 34 and the mounting surface 10a, and provided across the independent passages 39 from the upstream ends of the intake ports 17 and 18. The third passage 37 is provided to extend through the clearance between (i) the intercooler 36 and the supercharger 34 and (ii) the mounting surface 10a. The third passage 37 connects the rear of the intercooler 36 to the bottom of the surge tank 38 so that the intercooler 36 is located below the surge tank 38. The bypass passage 40 extends upward in a middle of the first passage 33, and then extends inside the engine body 10 (to the right). The bypass passage 40 branches off downstream into two, and the two branching passages 40 are connected to the upper part of the surge tank 38.

Next, the structures of the constituent elements of the intake path 30 will be described.

As illustrated in FIG. 3, the first passage 33 is shaped into a tube extending substantially along the cylinder bank (the right-left direction). An upper portion (the left) of the first passage 33 includes a throttle body 33a containing the throttle valve 32. The throttle body 33a is made of metal and shaped into a short cylinder, and located on the left and in front of the mounting surface 10a, with openings on both ends of the throttle body 33a facing in the left-right direction. The upstream end (i.e., the left end) of the throttle body 33a is connected to the air cleaner 31 via a passage (not shown), while the downstream end (i.e., the right end) of the throttle body 33a is connected to a first passage body 33b, which is the upstream (left) part of the first passage 33.

As shown in FIG. 3, the first passage body 33b connects the throttle body 33a to the supercharger 34. Specifically, the first passage body 33b is formed like a long cylinder with openings on its ends facing horizontally. The first passage body 33b is substantially axially aligned with the throttle body 33a in front of the mounting surface 10a. More specifically, the diameter of the first passage body 33b gradually increases from the interior toward the exterior (i.e., from the left to the right) along the cylinder bank. As described above, the upstream end (i.e., the left end) of the first passage body 33b is connected to the downstream end of the throttle body 33a. Whereas, the downstream end (i.e., the right end) of the first passage body 33b is connected to a suction port of the supercharger 34.

Moreover, the first passage body 33b has a branching portion 33d opening thereon and connected to the bypass passage 40. This branching portion 33d is formed on an upper surface of the first passage body 33b, and connected to the upstream portion (a curving pipe 45 to be described later) of the bypass passage 40.

Thus, fresh air purified in the air cleaner 31 and flowed into the first passage 33, passes through the throttle valve 32 to reach the first passage body 33b. In natural aspiration, this fresh air flows through the branch portion 33b into the bypass passage 40. Whereas, in supercharging, the fresh air joins the gas flowing back through the bypass passage 40, and is sucked into the supercharger 34 from the downstream end of the first passage body 33b.

Now, a passage structure close to the supercharger 34 and a passage structure close to the bypass passage 40 will be described in this order.

—Passage Structure Close to Supercharger—

First, the passage structure in which gas is sucked into the supercharger 34 will be described in detail.

As described above, the supercharger 34 according to this embodiment is a Roots supercharger. Specifically, the supercharger 34 includes: a pair of rotors (not shown), each of which has a rotating shaft extending along the cylinder bank; a casing 34b housing the rotors, and a drive pulley 34d rotating to drive the rotors. The supercharger 34 is coupled to the crankshaft 15 via a drive belt (not shown) looped around the drive pulley 34d. The electromagnetic clutch 34a is provided between the drive pulley 34d and the rotors. Selectively, the electromagnetic clutch 34a is engaged to transmit the driving force through the crankshaft 15 to the supercharger 34, and disengaged to block to driving force.

The casing 34b is shaped into a tube extending along the cylinder bank, and separates from each other the housing space of the rotors and the flow passage of the gas passing through the supercharger 34. Specifically, the casing 34b is shaped into a substantial cylinder extending along the cylinder bank and has a left end and a front end opening. As illustrated in drawings such as FIG. 4, the casing 34b is provided at a predetermined distance from a substantially central portion of the mounting surface 10a along the cylinder bank, and axially aligned with the first passage 33.

A suction port sucking the gas compressed by the rotors is open at the left longitudinal end of the casing 34b. The suction port is connected to the downstream end (i.e., the right end) of the first passage 33. On the other hand, as shown in FIGS. 6 and 7, a discharge port 34c is open to the front of the casing 34b so as to discharge the gas compressed by the rotors. The discharge port 34c is connected to the upstream end (i.e., the upper end) of the second passage 35.

The drive pulley 34d rotates to drive the rotors housed in the casing 34b. Specifically, the drive pulley 34d is shaped into a shaft projecting from the right end of the casing 34b, and extending to be substantially axially aligned with both the first passage 33 and the casing 34b. The drive belt is looped around the tip of the drive pulley 34d, and drives the crankshaft 15 and couples the crankshaft 15 to the supercharger 34, depending on engagement or disengagement of the electromagnetic clutch 34a described above.

As shown in FIGS. 4 and 5, the second passage 35 connects the supercharger 34 to the intercooler 36. The second passage 35 according to this embodiment is formed to extend in the vertical direction of the engine 1 so that the supercharger 34 and the intercooler 36 are vertically adjacent to each other. As shown in FIG. 5, both of the vertical ends of the second passage 35 are open toward the rear (toward the engine body 10). The upper opening of the second passage 35 is connected to the front (specifically, the discharge port 34c) of the casing 34b, while the lower opening of the second passage 35 is connected to the front (specifically, an opening 36d to be described later) of the intercooler 36.

As described above, the intercooler 36 according to this embodiment is of a water-cooling type. As illustrated in FIGS. 4 and 5, the intercooler 36 includes a core 36a capable of cooling gas, and a cooler housing 36c housing the core 36a.

The core 36a is shaped into a cuboid having one side surface (rear surface) facing the mounting surface 10a. The front surface of the core 36a forms a surface through which gas flows in, while the rear surface of the core 36a forms a surface through which gas flows out. The front and rear surfaces are wider than any other surface of the core 36a. Although not shown, water tubes made of thin plates shaped into flat tubes are arranged in the core 36a. An exterior wall of each of the water tubes is provided with corrugated fins through brazing. Thanks to this configuration, the cooling water supplied through water supply pipes is introduced into the water tubes, and cools the high-temperature gas. The cooling water warmed after cooling the gas is discharged from the water tubes through water discharge pipes. The provided corrugated fins increase the surface areas of the water tubes to improve the effects of heat radiation.

The cooler housing 36c is provided below the casing 34b included in the supercharger 34. The cooler housing 36c defines the space for housing the core 36a, and forms a passage included in the intake passage 30 and interposed between the second passage 35 and the third passage 37.

Specifically, the cooler housing 36c is shaped into a thin rectangular box having a front surface and a rear surface both opening. Below the casing 34b, the rear surface and the mounting surface 10a are supported to face each other. Similar to the casing 34b, this rear surface is provided at a predetermined distance (see FIG. 5) from the mounting surface 10a of the engine body 10.

The opening 36d to the front surface of the cooler housing 36c is connected to the downstream end of the second passage 35, while the opening 36e to the rear surface of the cooler housing 36c is connected to the upstream end of the third passage 37.

The third passage 37 is formed integrally with the surge tank 38 and the independent passages 39, and connects the intercooler 36 to the surge tank 38 as shown in FIG. 5. Specifically, the third passage 37 includes a collection part 37a and an introduction part 37b in this order from upstream. The collection part 37a is fastened to the cooler housing 36c, and collects the gas passing through the intercooler 36. The introduction part introduces into the surge tank 38 the gas collected to the collection part 37a. The third passage 37 is provided below the surge tank 38 at least when the engine 1 is mounted in the vehicle.

The collection part 37a is shaped into a longitudinally thin box with a front surface (i.e., a surface close to the cooler housing 36c) opening. As illustrated in FIG. 5, the opening surface is connected to the opening 36e to the rear surface of the cooler housing 36c. The collection part 37a is located in the clearance between the rear surface of the cooler housing 36c, and the mounting surface 10a of the engine body 10. In addition, the rear surface of the collection part 37a is connected to the upstream end of the introduction part 37b.

The introduction part 37b is formed as a curving pipe extending substantially vertically. The introduction part 37b has an upstream end connected to the rear surface of the collection part 37a and a downstream end connected to a center portion of the bottom face of the surge tank (see FIGS. 6 and 7). As illustrated in FIG. 5, for example, this introduction part 37b extends through the clearance between (i) the region from the rear surface of the collection part 37a to the rear surface of the casing 34b of the supercharger 34 and (ii) the mounting surface 10a of the engine body 10.

More specifically, as illustrated in FIG. 6, the upstream part of the introduction part 37b is connected to the collection part 37a and extends obliquely upward to the right from the connection (see an interval S2). Meanwhile, the downstream portion of the introduction part 37b is formed to extend upward in a vertical direction and connect to the surge tank 38 (see an interval 51). This formation allows the downstream end of the introduction part 37b to extend substantially orthogonal to the gas flow in the independent passages 39, as viewed from one side of the cylinder bank (see FIG. 5).

The surge tank 38 is shaped into a substantial cylinder extending along the cylinder bank, and having closed ends along the cylinder bank. As described above, this surge tank 38 is provided across the independent passages 39 from the upstream ends of the intake ports 17 and 18 (see FIG. 5). Thanks to this provision, the surge tank 38 is to be positioned near the inlets (the upstream ends) of the intake ports 17 and 18 when the independent passages 39 are shaped into a short cylinder as described later. This is advantageous in reducing the lengths of the passages (runners) from the surge tank 38 to the intake ports 17 and 18.

As shown in FIG. 7, the bottom of the surge tank 38 is connected to the downstream end of the third passage 37 (the introduction part 37b). Specifically, the surge tank 38 has an inner bottom face 38a a center of which (specifically a center along the cylinder bank) is provided with an inlet 38b having a substantially circular cross-section. The introduction part 37b has a downstream end connected to the surge tank 38 through this inlet 38b.

The inlet 38b has a diameter larger than the intake ports 17 and 18.

In the surge tank 38, the size from the inlet 38b to one end of the surge tank 38 along the cylinder bank (i.e., one end close to the first cylinder 11A) is substantially equal to the size from the inlet 38b to the other end of the surge tank 38 along the cylinder bank (i.e., one end close to the fourth cylinder 11D). This configuration allows reliable distribution of intake air, and is eventually advantageous in reducing differences in charging efficiencies among the cylinders.

Specifically, four pairs of the independent passages 39 (i.e., eight independent passages 39 in total) are arranged along the cylinder bank at the rear surface of the surge tank 38. When the engine 1 is mounted in the vehicle, each of the eight independent passages 39 is formed to be a short cylindrical passage extending substantially straight toward the rear. One end (an upstream end) of the independent passage 39 communicates with the space inside the surge tank 38, while the other end (a downstream end) of the independent passage 39 is open toward the engine body 10 (the rear).

Each of the four pairs of the independent passages 39 is provided to a corresponding one of the four pairs of the intake ports 17 and 18. When components of, for example, the third passage 37, the surge tank 38, and the independent passages 39 are mounted on the engine body 10, the independent passages 39 and the corresponding intake ports 17 and 18 form a single passage.

As described above, each pair of the independent passages 39 includes an independent passage 391 corresponding to the first port 17, and an independent passages 392 corresponding to the second port 18. Hence, when the components of, for example, the third passage 37, the surge tank 38, and the independent passages 39 are mounted on the engine body 10, the first port 17 and the corresponding independent passage 391 form a single passage; whereas, the second port 18 and the corresponding independent passage 392 form a single passage. In this manner, eight independent passages in total are formed. Each of the eight independent passages in total is an example of a "downstream passage."

Then, as illustrated in FIG. 5, the independent passage 392 connected to the second port 18 is provided with the SCV 81 described before. The SCV 81 is a valve body shaped into a plate. The opening of the valve body is adjusted to control the flowage of the gas flowing through the independent passage 392. For example, when the opening of the valve body is narrowed, the flow rate of the gas passing through the second port 18 is reduced. Hence, the flow rate of the gas passing through one of the four first ports 17, which is connected to the same cylinder 11 as the second port 18 is connected to, can relatively increase.

As described above, the downstream portion of the bypass passage 40 branches off into two, and a downstream end of each of the branching passages (hereinafter referred to as "branching passages" 44b and 44c) is connected to the upper surface of the surge tank 38.

In order to obtain such a connection structure, first and second introduction parts 38c and 38d are provided on the upper surface of the surge tank 38. The first and second introduction parts 38c and 38d are spaced apart from each other along the cylinder bank, and allow the inside and outside of the surge tank 38 to communicate with each other.

Of the first and second introduction parts 38c and 38d, the first introduction part 38c located to one side (to the right) of the cylinder bank is connected to a downstream end of one of the branching passages (hereinafter also referred to as "the first branching passage") 44b; whereas, the second introduction part 38d located to the other side (to the left) of the cylinder bank is connected to a downstream end of the other branching passage (hereinafter also referred to as "the second branching passage") 44c (also see FIG. 9).

Specifically, each of the first and second introduction parts 38c and 38d is shaped into a short cylinder. As shown in FIG. 6, the first and second introduction parts 38c and 38d extend from the upper surface of the surge tank 38 obliquely upward and forward perpendicularly to the cylinder bank.

As illustrated in FIG. 6, in the surge tank 38, the first introduction part 38c is provided to face a portion near the independent passage 392 corresponding to the second port 18B of the second cylinder 11B. On the other hand, the second introduction part 38d is provided to face a portion near the independent passage 392 corresponding to the second port 18D of the fourth cylinder 11D. The configuration of the first introduction part 38c defines a connection between the first branching passage 44b and the surge tank 38, and the configuration of the second introduction part 38d defines a connection between the second branching passage 44c and the surge tank 38.

Moreover, as illustrated in FIGS. 6 and 7, the surge tank 38 has an interior bottom face 38a formed below the lower surface of the upstream end of each of the eight independent passages 39 when the engine 1 is mounted in the vehicle. On both sides (the left and right sides along the cylinder bank) of the inlet 38b opening on the interior bottom face 38a, a pair of walls 71 and 72 stand on the right and left so that one of the walls 71 and 72 is provided to either side of the inlet 38b. Each of the walls 71 and 72 is provided to either side of the inlet 38b formed to act as a connection between the third passage 37 and the surge tank 38, so that the walls 71 and 72 stand from the interior bottom face 38a of the surge tank 38 along the flow of the gas. The walls 71 and 72 are the same in height.

Specifically, in supercharging, an output from the crankshaft 15 is transmitted during the operation of the engine 1 through the drive belt and the drive pulley 34*d* to rotate the rotors. The rotation of the rotors allows the supercharger 34 to compress the gas sucked through the first passage 33, and discharge the compressed gas through the outlet 34*c*. The discharged gas flows into the second passage 35 located in front of the casing 34*b*.

As indicated by an arrow A2 of FIG. 5, the gas discharged from the supercharger 34 and flowing into the second passage flows forward from the outlet 34*c* of the supercharger 34, and then flows downward along the second passage 35. The gas flowing downward reaches a lower part of the second passage 35, and then flows backward toward the intercooler 36.

Then, as indicated by an arrow A3 of FIG. 5, the gas passed through the second passage 35 flows inside the cooler housing 36*c* through the opening 36*d* in the front surface, and then flows backward from the front of the cooler housing 36*c*. When passing through the core 36*a*, the gas flowing inside the cooler housing 36*c* is cooled with cooling water supplied to the water tubes. The cooled gas flows out of the opening 36*e* in the rear surface of the cooler housing 36*c*, and then flows into the third passage 37.

As indicated by an arrow A4 of FIG. 5, the gas flowing from the intercooler 36 into the third passage 37 passes through the collection part 37*a*, flows obliquely upward to the right along the upstream portion of the introduction part 37*b* (see also section S1 of FIG. 8), and then flows vertically upward along the downstream part of the introduction part 37*b* (see also section S2 of FIG. 6). As indicated by an arrow A5 of FIG. 5, the gas passing through the introduction part 37*b* flows into the space in a substantially central portion of the surge tank 38 along the cylinder bank. After being temporary stored in the surge tank 38, the gas is then supplied via the independent passages 39 to the intake ports 17 and 18 of the cylinders 11.

—Passage Structure Close to Bypass Passage—

Next, a passage structure close to the bypass passage 40 will be described in detail.

Figure 8:
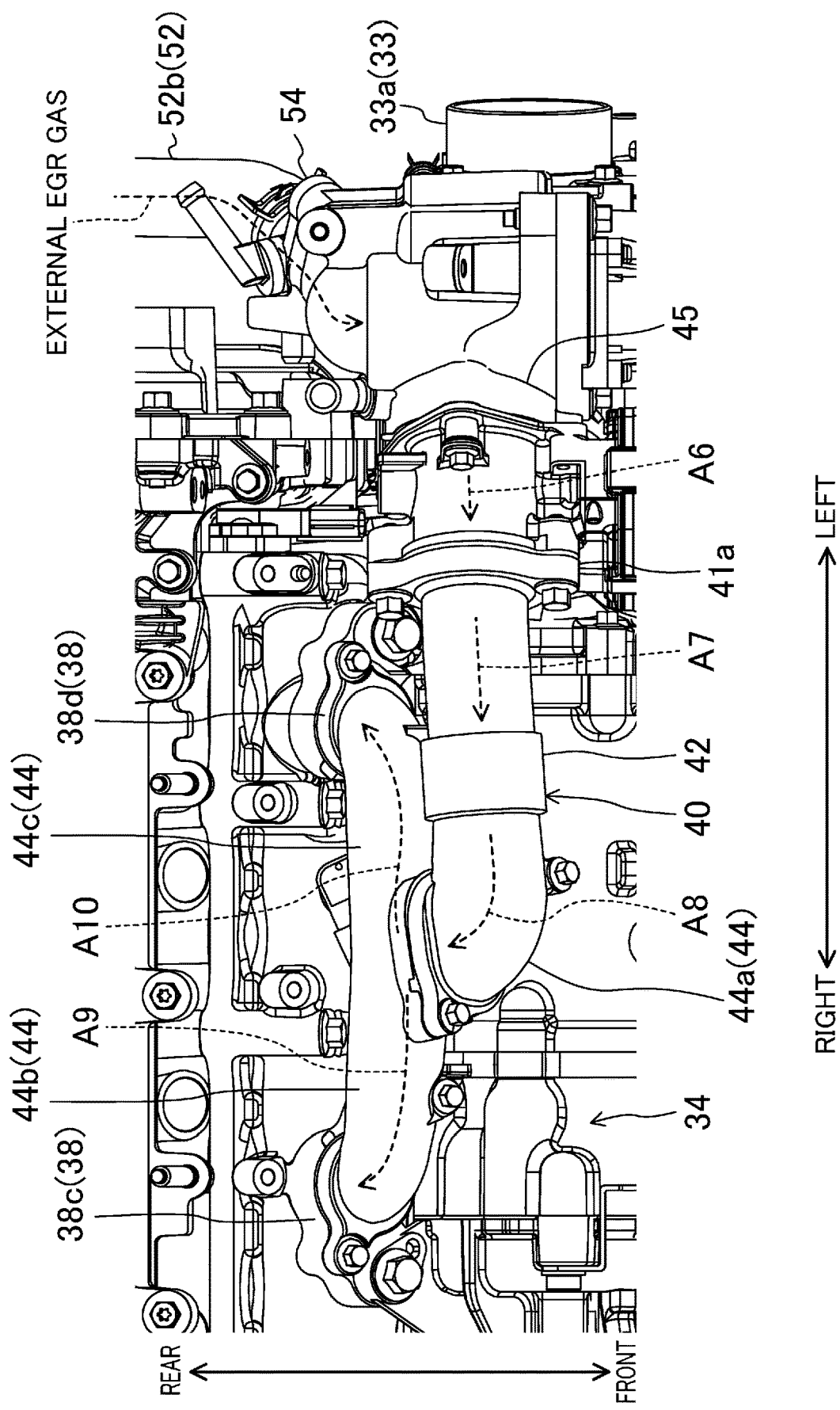
FIG. 8 is a view illustrating a passage structure close to a bypass passage, the structure being viewed from above.

FIG. 8 is an illustration of the passage structure, close to the bypass passage 40, viewed from above. FIG. 9 is a vertical cross-sectional view illustrating how the surge tank 38 and the bypass passage 40 are connected together.

As illustrated in FIG. 3, the bypass passage 40 extends obliquely upward to the left from the branching portion 33*d* opening on the first passage body 33*b*, and then extends substantially straight to the right (also see FIG. 8). The portion of the bypass passage 40 extending toward the right changes the direction to head obliquely downward and backward after reaching the region around the center of the surge tank 38 (specifically, the center in the direction along the cylinder bank), and then branches off into two passages. As described before, each of the branching passages is connected to the upper surface of the surge tank 38.

Specifically, the bypass passage 40 includes the following constitutional elements in the stated order: the curving pipe 45 changing a flow direction of the gas flowing from the branching portion 33*d*; a valve body 41*a* containing the bypass valve 41; a straight pipe 43 guiding the gas passing through the valve body 41*a* toward the right; and a branch pipe 44 guiding the gas passing through the straight pipe 43 obliquely downward and backward and branching into two to be connected to the surge tank 38.

Here, as described later, in order to improve performance for handling condensed water, the bypass passage 40 includes: a relay passage 40A branching off from the main intake passage 30A and extending obliquely upward to the left (above the engine); an upper passage 40B provided to extend from an upper end of the relay passage 40A and bypassing the supercharger 34.

As illustrated in FIG. 3, the upper passage 40B is provided above the main intake passage 30A, and the EGR passage 52 is connected to the upper passage 40B. A connection between the EGR passage 52 and the upper passage 40B is opened and closed by the EGR valve 54 provided to the upper passage 40B.

In this exemplary configuration, the relay passage 40A is a portion of the curving pipe 45; whereas, the upper passage 40B includes another portion of the curving pipe 45, the valve body 41*a*, and the straight pipe 43.

Described below in detail are the constituent elements of the bypass passage 40.

The curving pipe 45 is shaped into a cylinder extending obliquely upward to the left from the branching portion 33*d* and then extending substantially straight to the right, and provided above the first passage 33 (i.e., above the main intake passage 30A acting as the first intake passage) so that openings of the curving pipe 45 face downward and to the right.

The portion of the curving pipe 45 extending obliquely upward to the left is the relay passage 40A described above. This portion gradually increases in diameter as extending obliquely downward to the right. Such a feature is advantageous in enlarging an opening area of the branching portion 33*d*.

Meanwhile, the portion of the curving pipe 45 extending substantially straight toward the right is the upper passage 40B described above. The upper passage 40B of the curving pipe 45 overlaps the relay passage 40A along the cylinder bank. As illustrated in such drawings as FIG. 3, the upper passage 40B is provided with the EGR valve 54.

Hence, the gas flowing into the curving pipe 45 flows obliquely upward to the left. Then, along a turn of the curving pipe 45, the flow direction of the gas changes. As a result, the gas flowing through the curving pipe 45 flows from outside to inside (left to right) along the cylinder bank. As already described, the first passage body 33*b* is connected via the branching portion 33*d* to the upstream end (lower end) of the curving pipe 45, while the upstream end (left end) of the valve body 41*a* is connected to the downstream end (right end) of the curving pipe 45.

Note that as illustrated in FIG. 3, the downstream end of the EGR passage 52 is connected to the upper passage 40B of the curving pipe 45. The downstream end of the EGR passage 52 extends closer to the viewer on the drawing plane of FIG. 3, and is opened and closed by the EGR valve described above. The EGR passage 52 and the curving pipe 45 are connected substantially perpendicularly to each other on the drawing plane of FIG. 3.

Taking into consideration the valve body 41*a* provided downstream of the curving pipe 45, the downstream end of the EGR passage 52 is to be connected upstream of the bypass valve 41 in the bypass passage 40. Moreover, in the curving pipe 45, a lower wall face 45*a* to which the downstream end of the EGR passage 52 is connected is shaped so as to be recessed downward. This lower wall face 45*a* has a structure to receive water. The lower wall face 45*a* to receive water reduces the risk of condensed water generated in the EGR passage 52 and the upper passage 40B flowing into the main intake passage 30A.

The valve body 41*a* is shaped into a short cylinder. As illustrated in FIG. 3, the valve body 41*a* is provided above the first passage 33 and on the left of the supercharger 34, with openings on opposite ends each facing laterally. As described above, the downstream end of the curving pipe 45 is connected to the upstream end of the valve body 41a. Whereas, the upstream end (left end) of the straight pipe 43 is connected to the downstream end (right end) of the valve body 41a.

The straight pipe 43 is shaped into a long cylinder extending from one side toward the other side (specifically from left to right) along the cylinder bank. As can be seen in drawings such as FIG. 3, the straight pipe 43 is provided above the first passage 33 and the supercharger 34 to have openings at opposite ends facing laterally. As already described, the downstream end of the valve body 41a is connected to the upstream end of the straight pipe 43, while the upstream end (left end) of the branch pipe 44 is connected to the downstream end (right end) of the straight pipe 43.

The branch pipe 44 includes: a bent passage 44a bent like an elbow; and two branch passages 44b and 44c branching off like a tournament chart from the downstream end of the bent passage 44a. Above the supercharger 34 and the surge tank 38, the upstream end of the bent passage 44a faces the left, and both the branch passages 44b and 44c face obliquely downward and backward.

The two branch passages 44b and 44c are substantially the same in length. One of the branch passages; namely the first branch passage 44b, extends from the branch point to the right along the cylinder bank, and is then bent obliquely downward and backward. On the other hand, the other branch passage; namely the second branch passage 44c, extends from the branch point to the left along the cylinder bank, and is then bent obliquely downward and backward. As described above, each of the downstream ends of the two branch passages 44b and 44c is connected to a corresponding one of the first introduction part 38c and the second introduction part 38d formed on the top face of the surge tank 38. Specifically, the upper passage 40B is connected to the surge tank 38 through the two branch passages 44b and 44c.

When components of the bypass passage 40; namely the two bypass passages 44b and 44c, the first introduction part 38c and the second introduction part 38d, are attached to the surge tank 38, the components constitute a single passage.

In natural aspiration, the gas flowing into the bypass passage 40 passes through the components of the bypass passage 40 to reach the cylinders 11. That is, the gas passing through the throttle passage 32 flows from an intermediate portion of the first passage 33 into the curving pipe 45 of the bypass passage 40, depending whether the bypass valve 41 is open or closed. The gas flowing through the curving pipe 45 into the valve body 41a flows to the right as indicated by an arrow A6 of FIG. 8.

Then, as indicated by an arrow A7 of FIG. 8, the gas passing through the valve body 41a flows to the right along the straight pipe 43, and then flows into the branch pipe 44. As indicated by arrows A8 to A10 of FIG. 8, the gas flowing into the branch pipe 44 passes through the bent passage 44a, and is distributed to the first and second branch passages 44b and 44c. Then, the distributed gas flows into the surge tank 38 (also see arrows A9 and A10 in FIG. 9). The gas flowing into the surge tank 38 is supplied through the independent passage 39 to the intake ports 17 and 18 of each cylinder 11.

On the other hand, in supercharging, the gas flowing back from the surge tank 38 to the bypass passage 40 flows through the components of the bypass passage 40 in the direction opposite to the direction in natural aspiration, and flows into the first passage 33.

Furthermore, as described above, the downstream end of the EGR passage 52 is connected to the curving pipe 45 of the bypass passage 40. Hence, the bypass passage 40 conducts not only the gas flowing from the first passage 33 and the gas flowing backward from the surge tank 38, but also the external EGR gas.

A configuration of the EGR passage 52 will now be described in detail.

—Configuration of EGR Passage—

Figure 10:
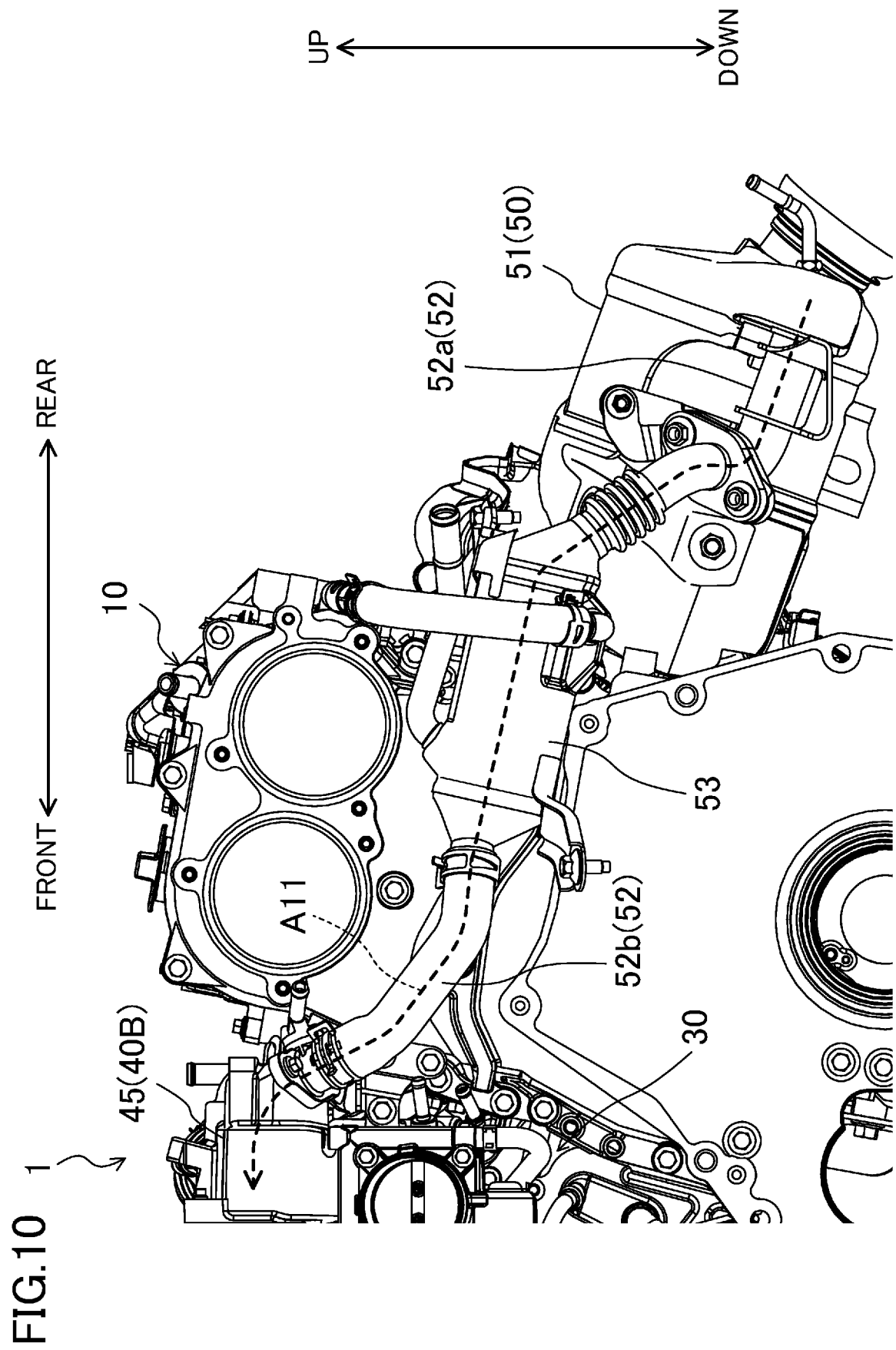
FIG. 10 is a view of the EGR passage viewed from the left.
Figure 11:
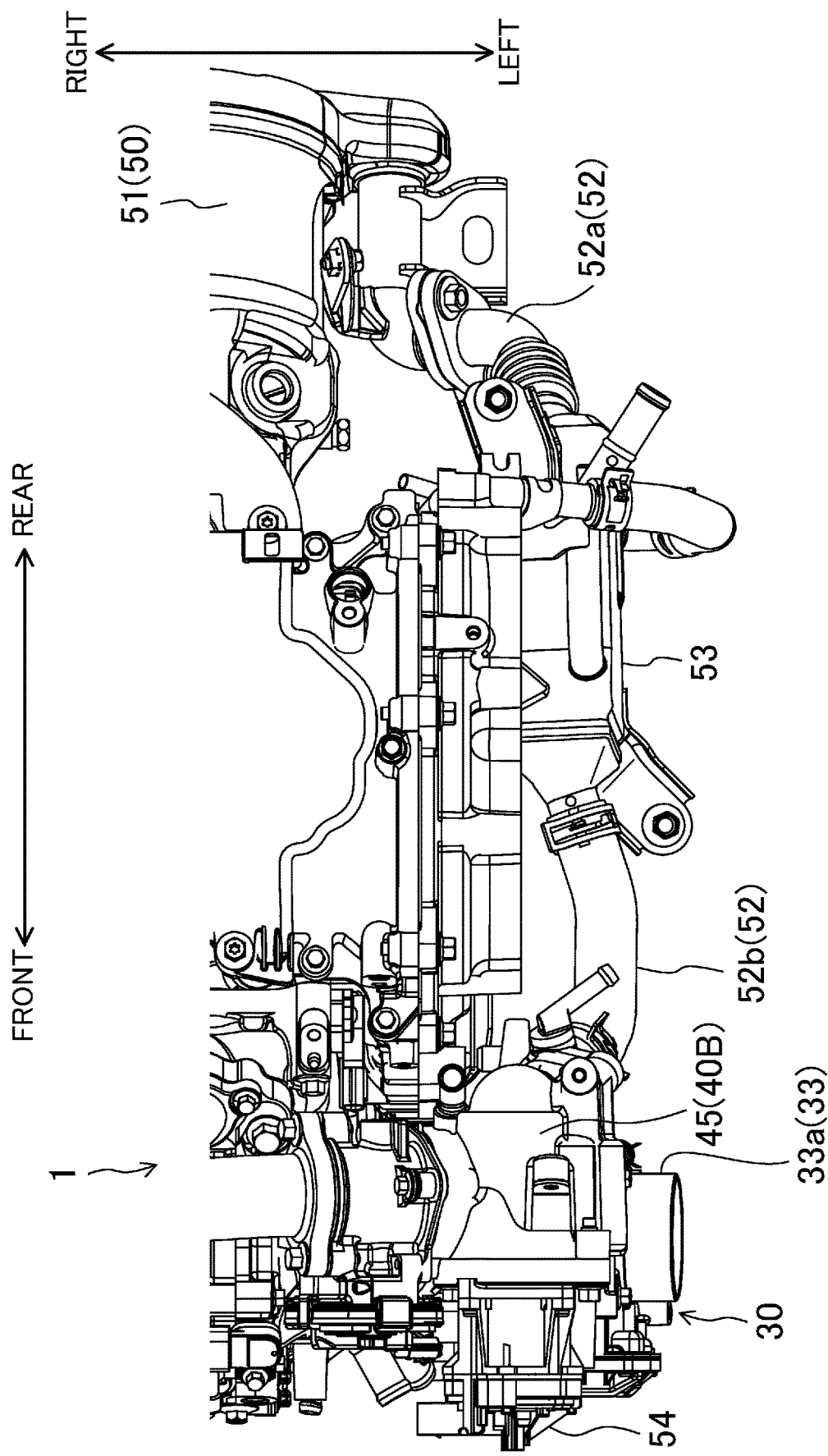
FIG. 11 is a view of the EGR passage viewed from above.
Figure 12:
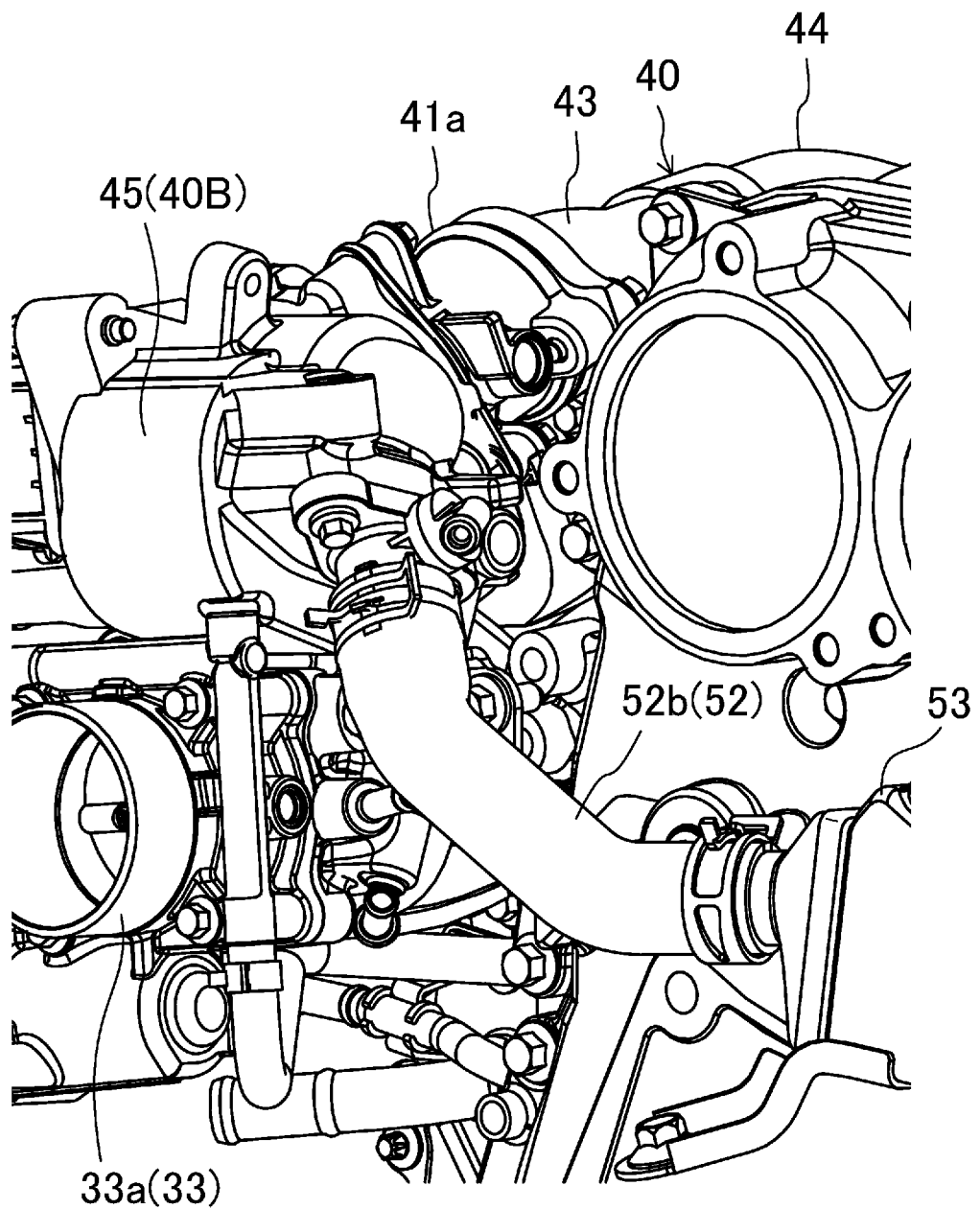
FIG. 12 is a view of a downstream end of the EGR passage, the downstream end being viewed from rear.
Figure 13:
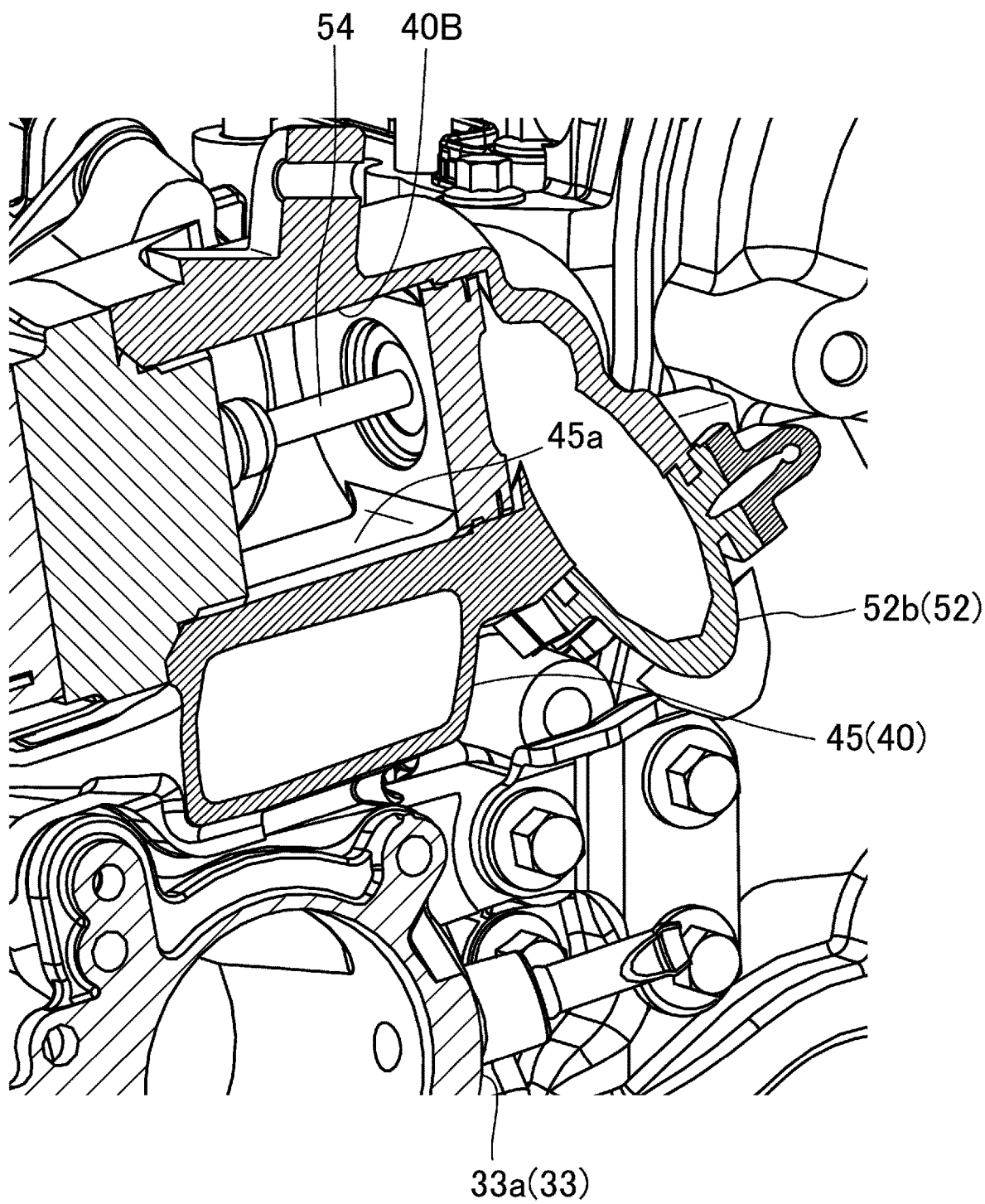
FIG. 13 is a cross-sectional view illustrating the downstream end of the EGR passage.
Figure 14:
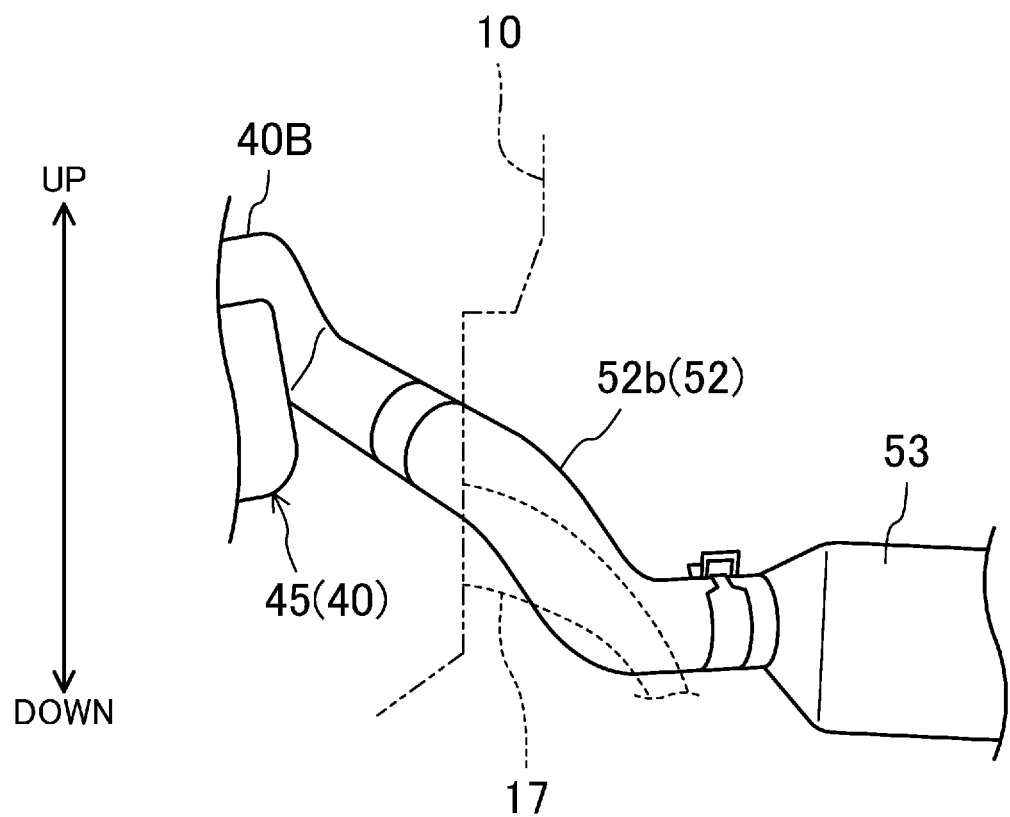
FIG. 14 is a view illustrating how the EGR passage and an intake port are positioned in relation to each other.

FIG. 10 is an illustration of the EGR passage 52 viewed from the left. FIG. 11 is an illustration of the EGR passage 52 viewed from above. Moreover, FIG. 12 is a view of the downstream end of the EGR passage 52, the downstream end being viewed from rear. FIG. 13 is a cross-sectional view illustrating the downstream end of the EGR passage 52. In addition, FIG. 14 is a view illustrating how the EGR passage 52 and the intake ports 17 and 18 are positioned in relation to each other. (Note that FIG. 14 illustrates the first port 17 alone.)

As illustrated in FIG. 10, the EGR passage 52 branches off from the exhaust passage 50 having the catalyst converter 51 interposed therein, and the downstream end of the EGR passage 52 is connected to the intake passage 30. Specifically, the EGR passage 52 branches off downstream of the catalyst converter 51 in the exhaust passage 50, and is connected upstream (specifically to the curving pipe 45) of the bypass valve 41 in the bypass passage 40 (also see FIG. 1).

As described above, the EGR passage 52 has an EGR cooler 53 interposed therein to cool the gas passing through the EGR passage 52. Hereinafter, in the EGR passage 52, a connection between the exhaust passage 50 and the EGR cooler 53 is referred to as an upstream EGR passage 52a; whereas, a connection between the EGR cooler 53 and the bypass passage 40 is referred to as a downstream EGR passage 52b.

Specifically, as illustrated in FIGS. 10 and 11, the upstream EGR passage 52a extends obliquely upward and forward along a left part of the exhaust passage 50. Then, the upstream EGR passage 52a turns left not to interfere with a left part of the engine body 10. Then, the upstream EGR passage 52a extends obliquely upward and forward again to reach the EGR cooler 53. As already described, the downstream portion of the catalyst converter 51 in the exhaust passage 50 is connected to the upstream end of the upstream EGR passage 52a; whereas an upstream end (rear end) of the EGR cooler 53 is connected to the downstream end (front end) of the upstream EGR passage 52a.

Figure 16:
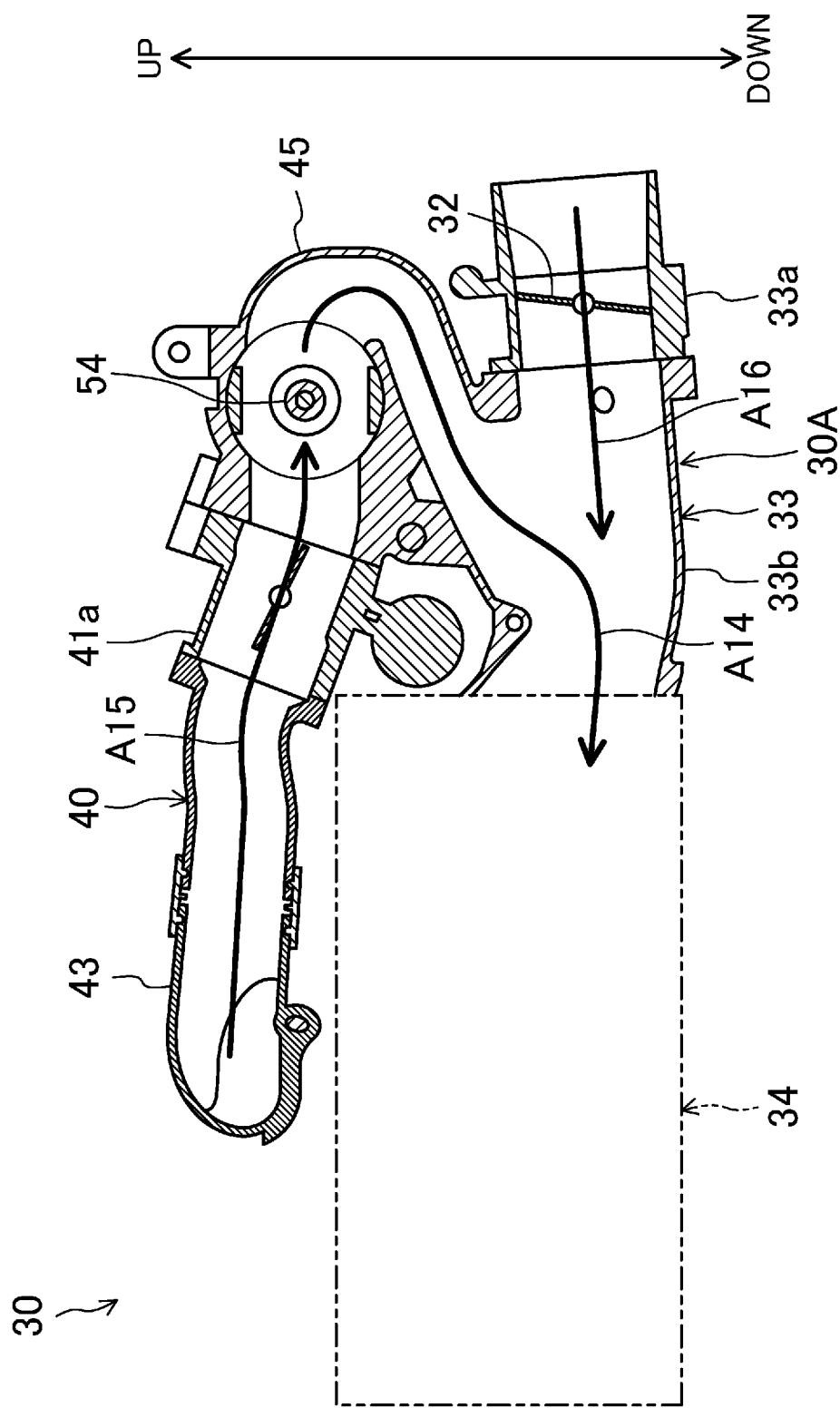
FIG. 16 is a view illustrating an example of a flow of external EGR gas in supercharging.

The EGR cooler 53 is shaped into a square tube slightly angled with respect to the front-aft direction. As illustrated in FIG. 16, at least when the engine 1 is mounted in the vehicle, the EGR cooler 53 is provided so that openings of both ends of the EGR cooler 53 face in the obliquely front-aft direction at substantially the same location of the intake ports 17 and 18 (the first port 17 alone is illustrated in FIG. 16) in the vertical direction. The upstream end of the EGR cooler 53 is directed obliquely downward and backward. As described before, the downstream end of the upstream EGR passage 52a is connected to the upstream end of the EGR cooler 53. Meanwhile, the downstream end (front end) of the EGR cooler 53 is directed obliquely upward and forward, and the upstream end (rear end) of the downstream EGR passage 52b is connected to the downstream end of the EGR cooler 53.

The downstream EGR passage 52b extends upward as running along the flow of the gas from downstream to upstream (i.e., as extending toward the upper passage 40B to which the EGR passage 52 is to be connected). Specifically, as illustrated in FIGS. 10 to 12, the downstream EGR passage 52b extends obliquely upward and forward along the left part of the engine body 10, and turns substantially forward. Hence, in the EGR passage 52, the EGR cooler 53 has a downstream portion and an upstream portion, the downstream portion being higher than the upstream portion.

Then, the downstream end of the downstream EGR passage 52b extends substantially forward, and connects from behind to the curving pipe 45 of the bypass passage 40. As illustrated in FIGS. 3 and 13, this downstream end is opened and closed by the EGR valve 54. Note that, as illustrated in FIG. 14, the downstream end of the downstream EGR passage 52b and the upper passage 40B to which the downstream end of the downstream EGR passage 52b is connected are arranged above the intake ports 17 and 18 (in particular, the upstream ends of the intake ports located to the left of the drawing plane).

Along with the combustion of the air-fuel mixture, the combusted gas exhausted from the combustion chamber 16 to the exhaust passage 50 passes through the catalyst converter 51. Then, part of the combusted gas passing through the catalyst converter 51 is introduced into the EGR passage 52. As indicated by an arrow A11 of FIG. 10, the combusted gas introduced into the EGR passage 52 passes through the upstream EGR passage 52a, the EGR cooler 53, and the downstream EGR passage 52b in the stated order to be introduced into the bypass passage 40 as the external EGR gas. The amount of the external EGR gas to be introduced is adjusted by the opening of the EGR valve 54.

Figure 15:
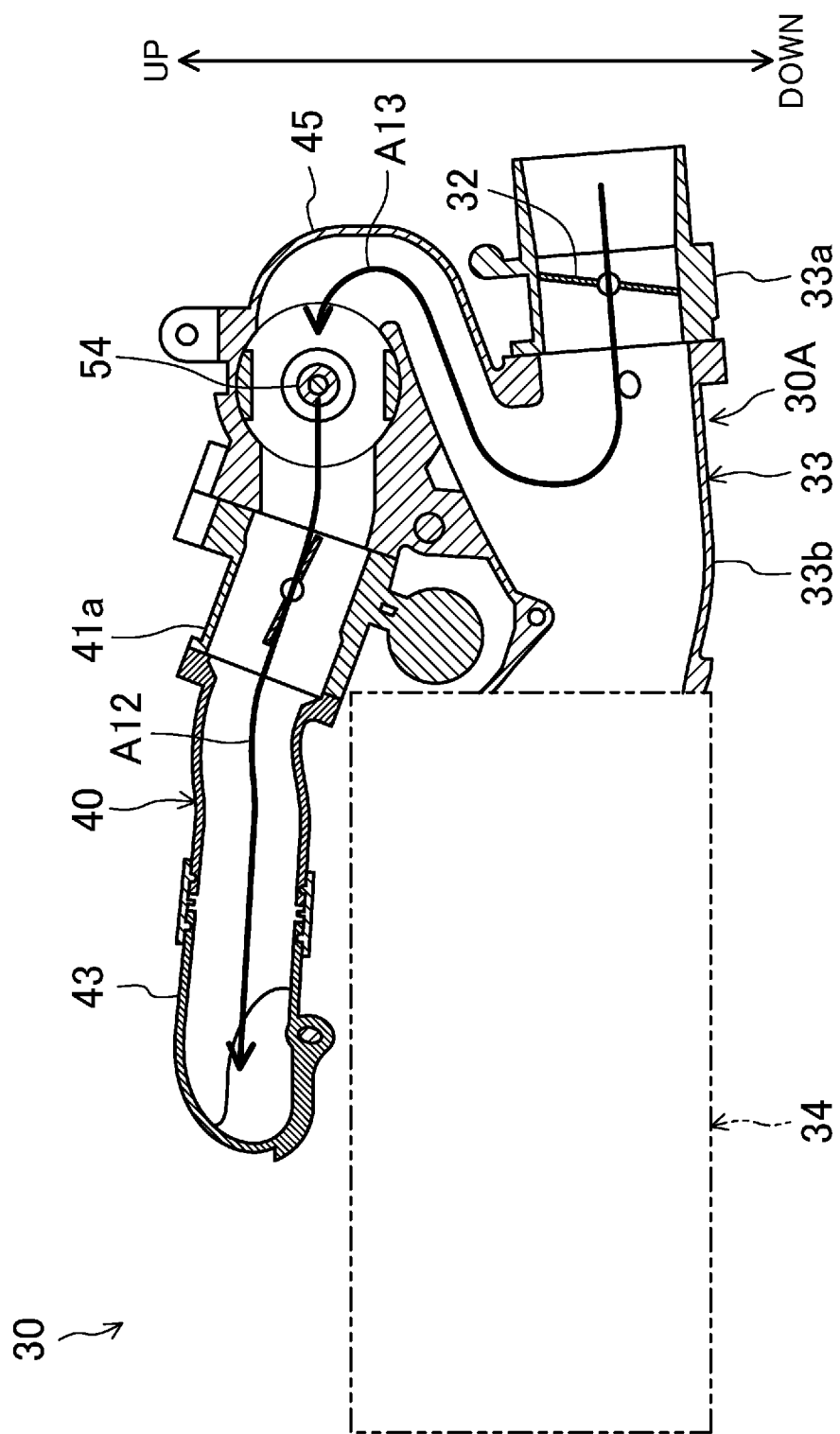
FIG. 15 is a view illustrating an example of a flow of external EGR gas in natural aspiration.

FIG. 15 is a view illustrating an example of the flow of the external EGR gas in natural aspiration. FIG. 16 is a view illustrating an example of the flow of external EGR gas in supercharging.

In natural aspiration, the external EGR gas flowing into the bypass passage 40 passes through the throttle valve 32 and joins the fresh air (see an arrow A13) flowing from the first passage body 33b into the bypass passage 40. As illustrated in an arrow A12 of FIG. 15, the external EGR gas flows through the bypass passage 40 from upstream to downstream. The external EGR gas joining in the fresh air flows into the surge tank 38, passes through the independent passage 39 and the intake ports 17 and 18 in this order, and reaches the combustion chamber 16.

In supercharging, as indicated by an arrow A14 of FIG. 16, the external EGR gas flowing into the bypass passage 40 joins the gas flowing back from the surge tank 38 to the bypass passage 40, and flows backward through the bypass passage 40 from downstream to upstream. The gas flowing backward into the first passage body 33b passes through the throttle valve 32, joins the fresh air (see an arrow A16) flowing into the first passage body 33b, and is sucked into the supercharger 34.

(Configuration for Handling Substance in External EGR Gas)

The engine 1 includes an ECU for operating the engine 1. The ECU determines an operation state of the engine 1 based on detection signals output from various sensors, and calculates control variables of various actuators. The ECU outputs control signals corresponding to the calculated control variables to such devices as the injector 6, the spark plug 25, the electric intake S-VT 23, the electric exhaust S-VT 24, the fuel supply system 61, the throttle valve 32, the EGR valve 54, the electromagnetic clutch 34a of the supercharger 34, the bypass valve 41, and a flow rate control device 80 to operate the engine 1.

Operating ranges of the engine 1 are classified based on, for example, engine speeds and loads. The ECU controls actuators to achieve an operation state corresponding to each of the operating ranges.

For example, in an operating range at a load lower than a predetermined load (hereinafter referred to as "a low fuel consumption range"), the engine 1 is operated in natural aspiration. Specifically, the ECU causes the electromagnetic clutch 34a to disengage, and fully opens the bypass valve 41.

Meanwhile, in an operating range at a load higher than the predetermined load (hereinafter referred to as "a supercharging range"), the ECU causes the supercharger 34 to be driven to supply the gas to be introduced into the cylinders 11. Specifically, the ECU causes the electromagnetic clutch 34a to engage and appropriately adjust the opening of the bypass valve 41.

Here, when the external EGR gas is to be introduced into the intake passage 30 as described in this embodiment, such substances as water and soot included in the external EGR gas are also flown back to the intake passage 30. Such substances are guided to the combustion chamber 16 with a flow of the gas, and evaporated and combusted in the combustion chamber 16.

However, in an engine equipped with a supercharger, the substances carried by the gas flow adhere to, and are deposited inside, the supercharger 34. As a result, the performance of the supercharger 34 could deteriorate.

However, when the operating state of the engine 1 is in the low fuel consumption range, the engine 1 according to this embodiment creates a flow of the gas flowing through the bypass passage 40 by control of various actuators such as adjusting the opening of the bypass valve 41 according to a control signal entered by the ECU. Hence, this engine 1 operates so that the gas bypasses the supercharger 34 to reach the intake ports 17 and 18, and then to the combustion chamber 16.

Taking advantage of such a gas flow, the engine 1 allows the substances, flown back to the intake passage 30, to be guided to the combustion chamber 16 without passing through the supercharger 34.

In this case, substances can be guided to the combustion chamber 16 while the supercharger 34 is kept from deteriorating in performance; however, the inventors involved in the present application have diligently continued their studies and found out that this embodiment would have room to improve in smoothly introducing the substances, depending on how the intake passage 30 and the bypass passage 40 are located in relation to each other.

For example, as illustrated in FIGS. 5 and 8 in this embodiment, the bypass passage 40 (in particular, the upper passage 40B) is provided above the main intake passage 30A including the first passages 33, the second passage 35, the third passage 37, and the surge tank 38.

In this arrangement, if the downstream end of the EGR passage 52 were connected to the main intake passage 30A, the substances introduced into the intake passage 30 should be carried upward through the branching portion 33d in order to introduce the substance into the bypass passage 40. This case would be disadvantageous in smoothly introducing the substances for potential energy required to bring the substances up.

In this embodiment, as illustrated in FIG. 15, the upper passage 40B of the bypass passage 40 is provided above the main intake passage 30A; whereas, the downstream end of the EGR passage 52 is connected to the upper passage 40B. Specifically, the substances to be flown back to the intake passage 30 can be introduced directly into the bypass passage 40 without passing through the main intake passage 30A.

Compared with a configuration in which the downstream end of the EGR passage 52 is connected to the main intake passage 30A, the above configuration is advantageous in guiding the substances smoothly since the configuration eliminates the need of the potential energy for bringing up the substances from the main intake passage 30A to the bypass passage 30. The substances introduced into the bypass passage 40 is guided to the combustion chamber 16, using the gas flow as described above, and combusted in the combustion chamber 16 together with the air-fuel mixture.

The arrow A12 in FIG. 15 indicates that, taking advantage of the gas flow through the bypass passage 40, the gas can originally bypass the supercharger 34 to be guided to the combustion chamber 16.

Hence, without adhering to, and being deposited on, the supercharger 34, the substances in the external EGR gas can be smoothly guided to the combustion chamber 16.

Moreover, in this embodiment, the external EGR gas flowing back through the external EGR gas is introduced upstream of the bypass valve 41 in the bypass passage 40 (in particular, the upper passage 40B), as illustrated in FIG. 15. Hence, even in an operating state in which the bypass valve 41 is fully closed in, for example, a supercharging range, the external EGR gas can be guided from the bypass passage 40 to the main intake passage 30A.

Such a feature makes it possible to achieve both of smoothly guiding in the low fuel consumption range the substances in the external EGR gas to the combustion chamber 16, and guiding in the supercharging range the external EGR gas to the main intake passage 30A.

Moreover, the external EGR gas flowing through the EGR passage 52 is cooled when passing through the EGR cooler 53. Here, the water contained in the external EGR gas could be condensed water.

Then, as illustrated in FIG. 10, a portion of the EGR passage 52 downstream of the EGR cooler 53; namely the downstream EGR passage 52b, extends upward as running toward the upper passage 40B. In the EGR passage 52, the EGR cooler 53 has a downstream portion and an upstream portion, the downstream portion being higher than the upstream portion. Hence, the condensed water generated in the EGR cooler 53 flows down opposite the upper passage 40B (upstream of the EGR passage 52) by gravity, so that less condensed water reaches the second intake passage. As a result, the amount of water contained in the substances flown back to the bypass passage 40 can be reduced, which is advantageous in reducing the risk of the water adhering to the supercharger 34.

This configuration makes it possible to catch water to be flown back to the second intake passage, and temporally store the caught water. Hence, even in an operating range, such as the supercharging range, in which the gas is introduced through the first intake passage, the above configuration makes it possible to reduce the risk of the water in the external EGR gas flowing from the second intake passage to the first intake passage. This feature is advantageous in keeping such water from adhering to the supercharger.

Moreover, in the curving pipe 45, a lower wall face 45a to which the downstream end of the EGR passage 52 is connected is shaped so as to be recessed downward. Such a feature makes it possible to catch condensed water generated of water flowing from the EGR passage 52 into the bypass passage 40, and temporally store the condensed water. Hence, even in an operating range, as the supercharging range, in which the gas is introduced through the main intake passage 30A, the above feature makes it possible to reduce the risk of the condensed water flowing from the bypass passage 40 to the main intake passage 30A. This feature is advantageous in keeping such water from adhering to the supercharger 34.

Figure 9:
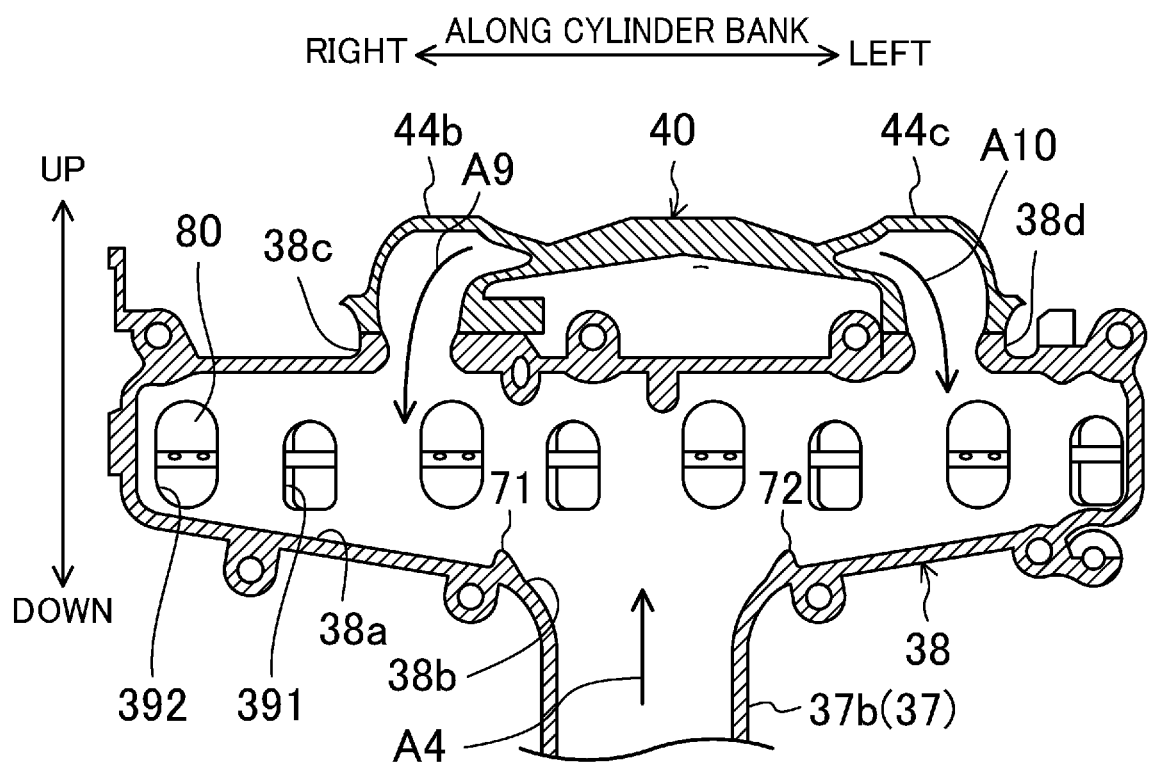
FIG. 9 is a vertical cross-sectional view illustrating how the surge tank and the bypass passage are connected together.

The downstream end of the bypass passage 40 is connected to the surge tank 38 as illustrated in FIG. 9. Compared with a configuration in which the downstream end of the bypass passage 40 is connected to a passage upstream of the surge tank 38, for example, the above feature makes it possible to provide the downstream end of the bypass passage 40 close to the intake ports 17 and 18. As a result, thanks to the gas flow through the bypass passage 40, the substances in the external EGR gas can be smoothly guided to the intake ports 17 and 18, and then to the combustion chamber 16.

As illustrated in FIG. 14, the downstream end of the EGR passage 52 and the upper passage 40B to which the downstream end is connected are arranged above the upstream ends of the intake ports 17 and 18. Such an arrangement makes it possible to guide the substances, contained in the external EGR gas introduced from the EGR passage into the bypass passage 40, to the upstream ends of the intake ports 17 and 18, eliminating the need of guiding the substances against the gravity. As a result, the substances can be smoothly introduced into the combustion chamber 16.

Originally, the downstream end of the EGR passage 52 is connected to a portion, of the bypass passage 40, extending horizontally; that is, specifically, along an output shaft of the engine (along the cylinder bank in this example). Such a feature is advantageous in keeping water, introduced from the EGR passage 52 into the bypass passage 40, from flowing down to the main intake passage 30A.

Configuration for Handling Backflow of Condensed Water

During operation of the engine 1, when such gas as fresh air and the external EGR gas containing water is cooled by the intercooler 36, condensed water is generated from the water in the passage downstream of the intercooler 36.

A normal engine has a surge tank provided downstream of an intercooler, such that the condensed water is usually generated in the surge tank and deposited on the bottom of the surge tank.

In this exemplary configuration, when the intercooler 36 is provided below the surge tank 38, the condensed water flowing down by gravity might stay on the bottom of the intercooler 36. Thus, for example, when the load on the engine 1 increases such that a flow rate of the gas taken from outside increases, the condensed water could enter in large amount from the intercooler 36 through the surge tank 38 and the intake ports 17 and 18 into the combustion chamber 16, and cause water hammer. The water hammer is disadvantageous in providing the engine 1 with sufficient durability.

As a counter measure, the surge tank 38 and the intercooler 36 could be horizontally arranged side by side to keep the condensed water from backflow into the intercooler; however, this layout is not advantageous because such a layout makes the engine size excessively large as a whole and the arrangement of the entire intake passages difficult.

Hence, in this embodiment, an interval between (i) the upstream end of the third passage 37 and (ii) a connection of the downstream end of the third passage 37 to the surge tank 38 (equivalent to the intervals S1 and S2 in this exemplary configuration) is provided with a backflow reduction structure receiving water flowing against the gas flow. Specifically, as illustrated in FIGS. 6, 7, and 9, the backflow reduction structure includes a pair of the walls 71 and 72 formed on a periphery of the inlet 38b of the surge tank 38. The walls 71 and 72 reduce the amount of the condensed water flowing from the surge tank 38 toward the intercooler 36.

In this configuration, the intake passage 30 is provided with the backflow reduction structure in an interval including a passage downstream of the intercooler 36. Such a feature allows the condensed water, generated in the surge tank 38 and flowing into the surge tank 38 from outside, to be received by the backflow reduction structure. Specifically, the wall 71 acting as the backflow reduction structure receives, on the right side surface of the wall 71, the condensed water adhering to the right portion of the interior bottom face 38a of the surge tank 38. Similarly, the wall 72; namely the other one of the pair in combination with the wall 71, receives on the left side surface of the wall 72, the condensed water adhering to the left portion of the interior bottom face 38a of the surge tank 38. Such a feature makes it possible to reduce backflow of the condensed water, eventually reducing the risk of water hammer.

Moreover, the backflow reduction structure can be formed together with the surge tank 38 and the intercooler 36 vertically arranged. Even if flowing down by gravity, the condensed water can be received by the backflow reduction structure before reaching the intercooler 36. Such a feature is advantageous in downsizing the engine 1.

Hence, the backflow reduction structure allows the engine 1 to be downsized and reduce the risk of water hammer caused by the condensed water.

Moreover, as illustrated in FIGS. 8, 9, and 14, the pair of the walls 71 and 72 as the backflow reduction structure is formed around the inlet 38b of the surge tank 38. Compared with a configuration in which the walls 71 and 72 are formed in an intermediate portion of the third passage 37, the above feature can keep the condensed water near the intake ports 17 and 18. Hence, using the flow of intake air flowing into the surge tank 38, the condensed water can be smoothly introduced into the combustion chamber 16. This is advantageous in maintaining low in the amount of the stored condensed water.

Moreover, as illustrated in FIG. 9, the first introduction part 38c and the second introduction part 38d are offset along the cylinder bank with respect to both the inlet 38b of the surge tank 38 and the pair of the walls 71 and 72.

For example, if the first introduction part 38c and the inlet 38b are arranged in the same position along the cylinder bank, the water contained in the gas introduced from the bypass passage 40 could condense, and flow through the inlet 38b and down to the intercooler 36 without flowing down to the interior bottom surface 38a on the right of the wall 71.

In contrast, as illustrated in FIG. 9, the first introduction part 38c is offset with respect to both the inlet 38b and the pair of the walls 71 and 72. Hence, even if the water contained in the gas introduced from the bypass passage 40 into the surge tank 38 condenses, the condensed water is generated in a position offset along the cylinder bank with respect to both the inlet 38b and the pair of the walls 71 and 72. As a result, the pair of the walls 71 and 72 can receive the condensed water. The same is true in the second introduction part 38d.

Moreover, the backflow reduction structure includes the pair of the walls 71 and 72 standing, along a flow of the gas, at the interior bottom face 38a of the surge tank 38. Hence, the gas can smoothly flow along the walls 71 and 72. Such a feature can reduce the risk that the gas hits the walls acting as an impactor, accidentally generating the condensed water.

Furthermore, this feature makes it possible to implement the backflow reduction structure without increasing the resistance of the sucked gas. Specifically, the feature can reduce backflow of the condensed water as well as pumping loss.

OTHER EMBODIMENTS

The above embodiment is directed to, but not limited to, the transverse engine 1 mounted in an FF vehicle. The engine 1 may be longitudinally mounted in a front-engine, rear-wheel drive (FR) vehicle.

Moreover, the above embodiment is directed to, but not limited to, an in-line four-cylinder engine. For example, the embodiment may be directed to a single-cylinder engine and an in-line six-cylinder engine. In addition, the number of passages to branch off from the bypass passage 40 may be changed, depending on the number of the cylinders.

In the above embodiment, the pair of the walls 71 and 72 as the backflow reduction structure is formed around, but not limited to, the inlet 38b of the surge tank 38. The backflow reduction structure may be formed in any given position between the upstream end of the third passage 37 and the periphery of the inlet 38b of the surge tank 38.

The above embodiment is directed to a supercharger (i.e., the supercharger 34) as an example. Alternatively, the above embodiment may be directed to a turbo charger. In the above embodiment, the supercharger 34 is not essential.

What is claimed is:
1. An intake and exhaust device for an automotive engine including a plurality of cylinders arranged in line, each of the cylinders provided with a combustion chamber, the device comprising:
   an intake passage and an exhaust passage connected to the combustion chamber of the automotive engine; and
   an EGR (exhaust gas recirculation) passage branching off from the exhaust passage and having a downstream end connected to the intake passage, wherein
   the intake passage includes:
      a first intake passage including an intake port communicating with the combustion chamber and having a supercharger interposed in the first intake passage; and
      a second intake passage branching off, from the first intake passage, upstream of the supercharger, and bypassing the supercharger to communicate with the combustion chamber,
   the first intake passage including a downstream passage having the intake port, and being connected through the intake port with the combustion chamber; and a surge tank having an upstream end of the downstream passage connected thereto,
   the second intake passage includes:
      a relay passage branching off from the first intake passage and extending above the automotive engine; and
      an upper passage extending from an upper end of the relay passage toward the surge tank and bypassing the supercharger,
   the upper passage being provided above the first intake passage,
   the upper passage branches off into two, and the two branching passages are spaced apart from each other along the cylinder bank, the upper passage further has a downstream end of each of the branching passages connected to an upper surface of the surge tank, and is positioned above the intake port, and the EGR passage is connected to the upper passage.

2. The device of claim 1, wherein the upper passage includes a flow rate adjustment valve changing a cross-sectional flow area of the second intake passage, and the EGR passage is connected to the upper passage upstream of the flow rate adjustment valve.

3. The device of claim 1, further comprising:

an EGR cooler interposed in the EGR passage, the EGR cooler cooling gas passing through the EGR passage, wherein in the EGR passage, the EGR cooler has a downstream portion and an upstream portion, the downstream portion being higher than the upstream portion.

4. The device of claim 1, wherein the connection of the upper passage to the EGR passage is provided with a water receiving structure to keep condensed water from flowing into the first intake passage, the condensed water being generated in the EGR passage and the upper passage.

5. The device of claim 1, further comprising: an intercooler interposed in the first intake passage upstream of the surge tank; and a backflow reduction structure that includes at least one wall, wherein in the first intake passage, the intercooler is located below the surge tank when the automotive engine is mounted in a vehicle, and the first intake passage includes an introduction passage connecting the intercooler and a bottom of the surge tank, and the backflow reduction structure is provided in an interval between (i) an upstream end of the introduction passage and (ii) a connection between a downstream end of the introduction passage and the surge tank, to reduce an amount of condensed water flowing toward the intercooler.

6. An intake and exhaust device for an automotive engine including a plurality of cylinders arranged in line, each of the cylinder provided with a combustion chamber, the device comprising:

an intake passage and an exhaust passage connected to the combustion chamber of the automotive engine; and an EGR (exhaust gas recirculation) passage branching off from the exhaust passage and having a downstream end connected to the intake passage, wherein the intake passage includes:

a downstream passage having the intake port, and being connected through the intake port with the combustion chamber; and a surge tank having an upstream end of the downstream passage connected thereto; and an upper passage provided above an upstream end of an intake port communicating with the combustion chamber, the upper passage branches off into two, and the two branching passages are spaced apart from each other along the cylinder bank, the upper passage further has a downstream end of each of the branching passages connected to an upper surface of the surge tank, and is positioned above the intake port, and the EGR passage is connected to the upper passage.

* * * * *